US012810310B2

(12) United States Patent
Steinbauer

(10) Patent No.: US 12,810,310 B2
(45) Date of Patent: Nov. 24, 2026

(54) APPARATUSES AND METHODS FOR CARBON EMISSIONS TRACKING AND OFFSET MANAGEMENT FOR ELECTRONIC NICOTINE DELIVERY SYSTEMS (ENDS) PRODUCTS

(71) Applicant: Loft Labs, LLC, New York, NY (US)

(72) Inventor: Martin Steinbauer, New York, NY (US)

(73) Assignee: SKYX IP Holdings I LLC, New York, NY (US)

( * ) Notice: Subject to any disclaimer, the term of this patent is extended or adjusted under 35 U.S.C. 154(b) by 0 days.

(21) Appl. No.: 18/749,571

(22) Filed: Jun. 20, 2024

(65) Prior Publication Data

US 2024/0428265 A1 Dec. 26, 2024

Related U.S. Application Data

(60) Provisional application No. 63/521,907, filed on Jun. 20, 2023.

(51) Int. Cl.
*G06Q 30/018* (2023.01)

(52) U.S. Cl.
CPC .................................. *G06Q 30/018* (2013.01)

(58) Field of Classification Search
CPC ............................................ G06Q 30/00–0185
See application file for complete search history.

(56) References Cited

U.S. PATENT DOCUMENTS 10,037,778 B1 * 7/2018 Farhan ............... G11B 20/1217
2010/0030608 A1 2/2010 Kaminsky et al.

FOREIGN PATENT DOCUMENTS

CN 115577943 A 1/2023
CN 117422210 A 1/2024

OTHER PUBLICATIONS

Stopwaste Partnership GHG "Greenhouse Gas Reductions Calculator" undated, one page, [Online] [Retrieved on Jul. 16, 2021] Retrieved from the Internet http://www.stopwaste.co/calculator (Year: 2021).*

* cited by examiner

*Primary Examiner* — Raquel Alvarez
(74) *Attorney, Agent, or Firm* — Caldwell LLC

(57) ABSTRACT

An apparatus and method for calculating comparison coefficients for dissimilar datasets is disclosed. The method includes receiving, using at least a processor, a plurality of successor carbon data relating to one or more successor components of a successor device. The method further includes receiving, using the at least a processor, a plurality of initial carbon data relating to one or more initial components of an initial device. The method includes generating, using the at least a processor, a comparison coefficient as a function of the successor device and the initial device, wherein the comparison coefficient compensates for a usage capacity of the initial device compared to the successor device. The method includes displaying, using the at least a processor and a graphical user interface, a carbon report as a function of the plurality of successor carbon data, the plurality of initial carbon data, and the comparison coefficient.

20 Claims, 9 Drawing Sheets

400

404, 412, 408, 416, 420

$$\sum_{i=1}^{n}\left(component_{i,new} \times CO2_{i,new}\right) \leq \sum_{j=1}^{m}\left(component_{j,old} \times CO2_{j,old}\right) \times Comp\ Coefficient$$

FIG. 4

APPARATUSES AND METHODS FOR CARBON EMISSIONS TRACKING AND OFFSET MANAGEMENT FOR ELECTRONIC NICOTINE DELIVERY SYSTEMS (ENDS) PRODUCTS

CROSS-REFERENCE TO RELATED APPLICATIONS

This application claims the benefit of priority of U.S. Provisional Patent Application Ser. No. 63/521,907, filed on Jun. 20, 2024, and titled "APPARATUSES AND METHODS FOR CARBON EMISSIONS TRACKING AND OFFSET MANAGEMENT FOR ELECTRONIC NICOTINE DELIVERY SYSTEMS (ENDS) PRODUCTS," which is incorporated by reference herein in its entirety.

FIELD OF THE INVENTION

The present invention generally relates to the field of data processing. In particular, the present invention is directed to methods and apparatus for calculating comparisons coefficients for dissimilar datasets.

BACKGROUND

Comparing dissimilar sets of data can be very difficult as dissimilar sets of data have different scaling. A new method for scaling dissimilar sets of data so that the sets of data can be easily compared is needed.

SUMMARY OF THE DISCLOSURE

In an aspect, an apparatus for calculating comparison coefficients for dissimilar datasets is disclosed. The apparatus includes at least a processor and a memory communicatively connected to the at least a processor, the memory containing instructions configuring the at least a processor to receive a plurality of successor carbon data relating to one or more successor components of a successor device. The memory further containing instruction configuring the at least a processor to receive a plurality of initial carbon data relating to one or more initial components of an initial device. The memory further containing instruction configuring the at least a processor to generate a comparison coefficient as a function of the successor device and the initial device, wherein the comparison coefficient compensates for a usage capacity of the initial device compared to the successor device. The memory further containing instruction configuring the at least a processor to display, using a graphical user interface, a carbon report as a function of the plurality of successor carbon data, the plurality of initial carbon data, and the comparison coefficient.

In another aspect, a method for calculating comparison coefficients for dissimilar datasets is disclosed. The method includes receiving, using at least a processor, a plurality of successor carbon data relating to one or more successor components of a successor device. The method further includes receiving, using the at least a processor, a plurality of initial carbon data relating to one or more initial components of an initial device. The method includes generating, using the at least a processor, a comparison coefficient as a function of the successor device and the initial device, wherein the comparison coefficient compensates for a usage capacity of the initial device compared to the successor device. The method includes displaying, using the at least a processor and a graphical user interface, a carbon report as a function of the plurality of successor carbon data, the plurality of initial carbon data, and the comparison coefficient.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 4 is a diagram of an exemplary metric comparison;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of this disclosure are directed to calculating comparisons coefficients for dissimilar datasets. In some embodiments, this may include generating a comparison coefficient using a machine-learning model. The data sets may include data regarding an initial device and data regarding a successor device. The comparison coefficient may be used to carry out a comparison between the carbon emissions associated with an initial device and a successor device.

Figure 1:
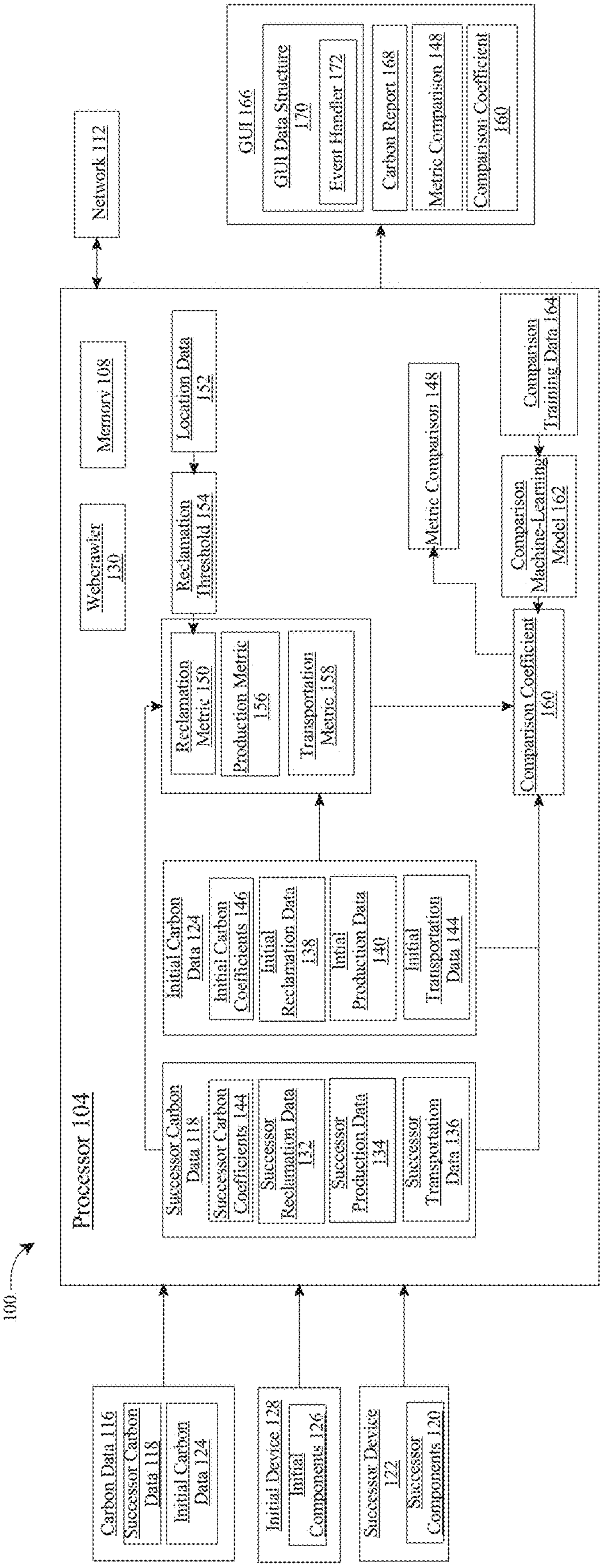
FIG. 1 is a diagram of an exemplary apparatus for calculating comparisons coefficients for dissimilar datasets.

Referring now to FIG. 1, an exemplary embodiment of an apparatus 100 for calculating comparisons coefficients for dissimilar datasets. In some embodiments, apparatus 100 may be used for carbon emissions tracking and offset management for electronic nicotine delivery systems (ENDS) Products. Apparatus 100 includes a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

Continuing to reference to FIG. 1, a computing device and/or apparatus 100 includes a memory 108 and at least a processor 104. Memory 108 may include any memory as described in this disclosure. Memory 108 is communicatively connected to processor 104. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Memory 108 may be configured to provide instructions to processor 104, which may include any processor/computing device as described in this disclosure.

With continued reference to FIG. 1, processor 104 may further comprise and/or be included in a server. A server may include a computing device and/or a plurality of computing devices that provide functionality for other programs or devices. A server may provide various functionalities such as sharing data or resources and performing computation among multiple other programs and or devices. Servers may include database servers, file servers, mail servers, print servers, web servers, and/or application servers. In an embodiment, the server may communicate with processor 104 through a communication network. A communication network may include a network interface card (e.g., a mobile network interface card, a LAN card), a modem, and any combination thereof. A communication network may also include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used. Information may be communicated to and/or from processor 104 through a communication network. In a non-limiting example, processor 104 may include security protections against software or software and hardware attacks, including without limitation attack scenarios in which a malicious actor may attempt to extract cryptographic keys for purpose of spoofing the key, the modify computer code, data or memory structures or similar; such protections may include, without limitation, a secure computing module or elements thereof as disclosed in further detail below. Processor 104 may also include public/private key pairs or other cryptographic key pairs, including without limitation symmetric public keys, elliptic curve based, keys, asymmetric public keys, and the like, or mechanisms to create them, for purposes of cryptographically authenticating the validity of processor 104 to another device, authenticating the validity of secure software loaded onto the device, or other data, including without limitation inputs, outputs, time of loading, and/or time of execution of software, boot sessions, or the like.

Continuing to reference to FIG. 1, apparatus 100 may include a network 112. Network 112 may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud", e.g., via the Internet, rather than on local severs or personal computers. A "mesh network" as used in this disclosure is a local network topology in which the processor 104 connects directly, dynamically, and non-hierarchically to as many other computing devices as possible. A "network topology" as used in this disclosure is an arrangement of elements of a communication network. Processor 104 may be communicatively connected to the network 112.

With continued reference to FIG. 1, processor 104 may receive carbon data 116. For the purposes of this disclosure, "carbon data" refers to data regarding the carbon emissions associated with the manufacturing, transportation, use, disposal, or reuse of a product or device. Carbon data 116 may include carbon emissions of a product or device. Carbon data 116 may include carbon emissions if a component of a product or device.

With continued reference to FIG. 1, processor 104 receives a plurality of successor carbon data 118. Successor carbon data 116 may relate to one or more successor components 120 of successor device 122. For the purposes of this disclosure, a "successor device," is a new or improved device that can be compared to a pre-existing device. For the purposes of this disclosure, "successor carbon data" is carbon data that is associated with a successor device 122. For the purpose of this disclosure, "successor components" are parts that make up a successor device 122.

With continued reference to FIG. 1, successor device 122 may include coffee capsules. In some embodiments, successor device 122 may include a coffee capsule coffee machine. In some embodiments, successor device 122 may include an electric vehicle. In some embodiments, successor device 122 may include an electronic vapor delivery device. An "electronic vapor delivery device," for the purposes of this disclosure, is an electronic device that is configured to deliver a vapor to a user. In some embodiments, electronic vapor delivery device may include a vaporizer, vape pen, hookah pen, electronic cigarette (e-cigarette or e-cig), e-cigar, e-pipe, or the like. In some embodiments, successor device 122 may include an electronic nicotine delivery device. For the purposes of this disclosure, an "electronic nicotine delivery device" is an electronic device that is configured to deliver nicotine to a user. In some embodiments, electronic nicotine deliver device may include a vaporizer, vape pen, hookah pen, electronic cigarette (e-cigarette or e-cig), e-cigar, e-pipe, wherein said devices are configured to deliver nicotine. In some embodiments, successor device 122 may include an oral nicotine product such as a pouch, a film, a pill, a lozenge or the like.

Continuing to refer to FIG. 1, apparatus 100 may be configured to carbon data 116, either by an opt in approach in which companies upload data or by a third party or regulatory authority. Apparatus 100 may be configured to analyze products by multiple companies across different technologies for accurate comparisons. Such an apparatus 100 may also be configured to aggregate companywide carbon data 116 across all or a plurality of product lines. The system of tracking can be used to track carbon capture efforts through upcycling of materials or incorporate novel carbon capture technologies such as Direct Air Capture Solutions. Further, such a system can include applications such as carbon emission taxation or a marketplace on carbon trading.

With further reference to FIG. 1, Electronic nicotine delivery systems (ENDS) are an important reduced risk product category which plays a necessary role in accomplishing a smoke-free world/future. There is an imminent need to quantify the environmental impact of ENDS especially vis-à-vis traditional combusted tobacco, and further mitigate environmental impact through establishing a universal ENDS recycling framework.

With continued reference to FIG. 1, successor components 120 may include plastic components, metal components, paper components, silicon components, and the like. In some embodiments, successor components 120 may include any components mentioned with respect to FIG. 3. In some embodiments, successor components 120 may include outer bodies, NFC chips, body bases, seals, plugs, PCB, reservoirs, mouthpieces, aerosolizable mixtures, pads, vapor tubes, heating elements, power sources, and the like. In some embodiments, successor components 120 may include seats, steering wheels, batteries, transmissions, tires, carpeting, windows, frames, and the like. In some embodiments, successor components 120 may include ground coffee, pods, paper seals, and the like. In some embodiments, successor components 120 may include pumps, reservoirs, rotational mechanisms, and/or any other components of a coffee pod coffee machine, such as a NESPRESSO or KEURIG.

With continued reference to FIG. 1, carbon data 116 may include the amount of carbon produced by manufacturing a device or device component. Carbon data 116 may include an amount of carbon produced by using a device or device component. Carbon data 116 may include an amount of carbon produced by transporting a device or device component. Carbon data 116 may include an amount of carbon produced by packaging a device or device component. Carbon data 116 may include an amount of carbon produced by recycling a device or device component.

With continued reference to FIG. 1, carbon data 116 may include a carbon emission datum. A "carbon emission datum," for the purposes of this disclosure is a datum describing the carbon emission of a device or user. In some embodiments, carbon data 116 may include greenhouse gas data. "Greenhouse gas data" as used in this disclosure is a metric associated with a pollutant that contributes to the greenhouse effect. In some embodiments, greenhouse gas data may include, but is not limited to, carbon emissions, methane, nitrous oxide, ozone, chlorofluorocarbons, hydrofluorocarbons, perfluorocarbons, and the like. Greenhouse gas data may include measurements associated with an amount of greenhouse gas generated. Carbon emission datum 124 may include an amount of greenhouse gas generated. An amount of greenhouse gas generated may be represented in, but is not limited to, metric tons, pounds, kilograms, cubic meters, and the like. As a non-limiting example, greenhouse gas data may include data showing 4 metric tons of carbon have been generated.

Still referring to FIG. 1, carbon data 116 and/or greenhouse gas data may be represented in energy and/or fuel consumed by a transport vehicle, total fuel consumed of a transport, energy consumed by a factory, and the like. Fuel may include, but is not limited to, gasoline, diesel, propane, liquefied natural gas, and/or other fuel types. In some embodiments, a transport vehicle may use alternative fuel. An "alternative fuel" as used in this disclosure is any energy source generated without a use of fossils. A "fossil" as used in this disclosure is preserved remains of any once-living organism. Alternative fuels may include, but are not limited to, nuclear power, compressed air, hydrogen power, bio-fuel, vegetable oil, propane, and the like.

Still referring to FIG. 1, carbon data 116 may include fuel consumption data. For the purposes of this disclosure, "fuel consumption data" is data pertaining to amounts of fuel consumed over a period of time. For example, this may be useful in determining the amount of carbon emissions for the transport of a device or device element. The period of time may be 1 day, 1 trip, 3 days, 1 week, 3 months, 2 years, and the like. As another non-limiting example, the period of time may be the period of time it took to complete a particular task—for example, delivering a device or device component. As a non-limiting example, if a task took 5 hours to complete, the period of time may correspond to those 5 hours. A "task," for the purposes of this disclosure is an item of work.

With continued reference to FIG. 1, successor carbon data 118 may include successor carbon data 118 associated with manufacturing of successor device 122 or successor component 120. For example, successor carbon data 118 may include successor carbon data 118 associated with the manufacturing of a successor component 120 such as a pump, reservoir, battery, and the like. In some embodiments, successor carbon data 118 may include successor carbon data 118 associated with the transport of a successor device 122 or successor component 120. In some embodiments, successor carbon data 118 may include successor carbon data 118 associated with the transport of successor device 122 or successor component 120 to a factory (e.g., for manufacturing or assembly.) In some embodiments, successor carbon data 118 may include successor carbon data 118 associated with the transport of successor device 122 or successor component 120 to a store (e.g., for sale.) In some embodiments, successor carbon data 118 may include successor carbon data 118 associated with the transport of successor device 122 or successor component 120 to an end use location (e.g., a home, office, and the like.) In some embodiments, successor carbon data 118 may include successor carbon data 118 associated with the transport of successor device 122 or successor component 120 to a disposal location (e.g., landfill or recycling center).

With continued reference to FIG. 1, processor 104 receives a plurality of initial carbon data 124 relating to one or more initial components 126 of an initial device 128. For the purposes of this disclosure, an "initial device," is a conventional device relative to a successor device. For the purposes of this disclosure, "initial carbon data" is carbon data that is associated with an initial device 128. For the purpose of this disclosure, "initial components" are parts that make up an initial device 128. In some embodiments, carbon data 116 may include initial carbon data 124.

With continued reference to FIG. 1, in some embodiments, initial device 128 may include a cigar, cigarette, or the like. In some embodiments, initial device 128 may include a combustion engine car. In some embodiments, initial device 128 may include an automatic drip coffee maker, French press, percolator, moka pot, espresso machine, and the like.

With continued reference to FIG. 1, initial carbon data 124 may include initial carbon data 124 associated with manufacturing of initial device 128 or initial component 126. For example, initial carbon data 124 may include initial carbon data 124 associated with the manufacturing of an initial component 126 such as a pump, reservoir, battery, and the like. In some embodiments, initial carbon data 124 may include initial carbon data 124 associated with the transport of an initial device 128 or initial component 126. In some embodiments, initial carbon data 124 may include initial carbon data 124 associated with the transport of initial device 128 or initial component 126 to a factory (e.g., for manufacturing or assembly.) In some embodiments, initial carbon data 124 may include initial carbon data 124 associated with the transport of initial device 128 or initial component 126 to a store (e.g., for sale.) In some embodiments, initial carbon data 124 may include initial carbon data 124 associated with the transport of initial device 128 or initial component 126 to an end use location (e.g., a home, office, and the like.) In some embodiments, initial carbon data 124 may include initial carbon data 124 associated with the transport of initial device 128 or initial component 126 to a disposal location (e.g., landfill or recycling center).

With continued reference to FIG. 1, processor 104 may receive carbon data 116 from one or more sensors. In some embodiments, processor 104 may receive initial carbon data 124 from one or more sensors. In some embodiments, processor 104 may receive successor carbon data 118 from one or more sensors. Sensors may include carbon dioxide sensors. Sensors may include fuel sensors.

With continued reference to FIG. 1, processor 104 may be configured to receive successor carbon data 118 using a web crawler 130. A "web crawler," for the purposes of this disclosure, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to scrape successor carbon data 118 from a plurality of manufacturer websites, industry watchdog websites, industry new sites, general new site, government regulator websites, and the like. The web crawler may be seeded and/or trained with a reputable website, such as epa.gov, to begin the search. A web crawler may be generated by a processor 104. In some embodiments, the web crawler may be trained with information received from an external user through a user interface. In some embodiments, the web crawler may be configured to generate a web query. A web query may include search criteria received from a user. For example, a user may submit a plurality of websites for the web crawler to search to user data statistics from and correlate to pecuniary user data, educational user data, social user data, and the like. Additionally, the web crawler function may be configured to search for and/or detect one or more data patterns. A "data pattern" as used in this disclosure is any repeating forms of information. A data pattern may include repeating pecuniary strategies, educational strategies, and the like. In some embodiments, the web crawler may be configured to determine the relevancy of a data pattern. Relevancy may be determined by a relevancy score. A relevancy score may be automatically generated by processor 104, received from a machine learning model, and/or received from the user. In some embodiments, a relevancy score may include a range of numerical values that may correspond to a relevancy strength of data received from a web crawler function. As a non-limiting example, a web crawler function may search the Internet for successor carbon data 118 related to a successor device 122. The web crawler may return successor carbon data 118, such as, as non-limiting examples, a successor reclamation data 132, successor production data 134, successor transportation data 136, and the like.

With continued reference to FIG. 1, processor 104 may be configured to receive initial carbon data 124 using a web crawler 130. In some embodiments, processor 104 may generate a web crawler to scrape initial carbon data 124 from a plurality of manufacturer websites, industry watchdog websites, industry new sites, general new site, government regulator websites, and the like. The web crawler may be seeded and/or trained with a reputable website, such as epa.gov, to begin the search. As a non-limiting example, a web crawler function may search the Internet for initial carbon data 124 related to an initial device 128. The web crawler may return initial carbon data 124, such as, as non-limiting examples, initial reclamation data 138, initial production data 140, initial transportation data 142, and the like.

With continued reference to FIG. 1, in some embodiments, plurality of successor carbon data 118 may include successor reclamation data 132. For the purposes of this disclosure, "successor reclamation data," is data relating to the carbon emissions associated with the recycling or repair of a successor device. Successor reclamation data 132 may include, e.g., the carbon emissions associated with recycling a device or device component. Successor reclamation data 132 may include, e.g., the carbon emissions associated with a device or device component sitting in a landfill. Successor reclamation data 132 may include, e.g., the carbon emissions associated with repairing a device or device component.

With continued reference to FIG. 1, in some embodiments, plurality of initial carbon data 124 may include initial reclamation data 138. For the purposes of this disclosure, "initial reclamation data," is data relating to the carbon emissions associated with the recycling or repair of an initial device 128. Initial reclamation data 138 may include, e.g., the carbon emissions associated with recycling a device or device component. Initial reclamation data 138 may include, e.g., the carbon emissions associated with a device or device component sitting in a landfill. Initial reclamation data 138 may include, e.g., the carbon emissions associated with repairing a device or device component.

With continued reference to FIG. 1, in some embodiments, plurality of successor carbon data 118 may include successor production data 134. "Successor production data," for the purposes of this disclosure, is data regarding the carbon emissions associated with the manufacturing, creation or assembly of a successor device 122. In some embodiments, plurality of initial carbon data 124 may include initial production data 140. "Initial production data," for the purposes of this disclosure, is data regarding the carbon emissions associated with the manufacturing, creation or assembly of an initial device 128.

With continued reference to FIG. 1, in some embodiments, plurality of successor carbon data 118 may include successor transportation data 136. "Successor transportation data," for the purposes of this disclosure, is data regarding the carbon emissions associated with the transport of a successor device 122 or the components thereof. Transport may include any transport along the supply chain for a successor device. Transport may include delivery to end users or merchants. Transport may include any transport that is part of the disposal or recycling process. In some embodiments, plurality of initial carbon data 124 may include initial transportation data 142. "Initial transportation data," for the purposes of this disclosure, is data regarding the carbon emissions associated with the transport of an initial device 128 or the components thereof. Transport may include any transport along the supply chain for an initial device. Transport may include delivery to end users or merchants. Transport may include any transport that is part of the disposal or recycling process.

With continued reference to FIG. 1, in some embodiments, successor reclamation data 132 may include plastic reclamation data. For the purposes of this disclosure, "plastic reclamation data" is data regarding the carbon emissions associated with the reclamation of plastic from a device. In some embodiments, plastic reclamation data may include data regarding carbon emissions prevented by or as a result of the plastic reclamation process.

With continued reference to FIG. 1, in some embodiments, successor reclamation data may include electrolyte reclamation data. For the purposes of this disclosure, "electrolyte reclamation data" is data regarding the carbon emission associated with the reclamation of electrolyte from a device. In some embodiments, plastic reclamation data may include data regarding carbon emissions prevented by or as a result of the electrolyte reclamation process.

Figure 2:
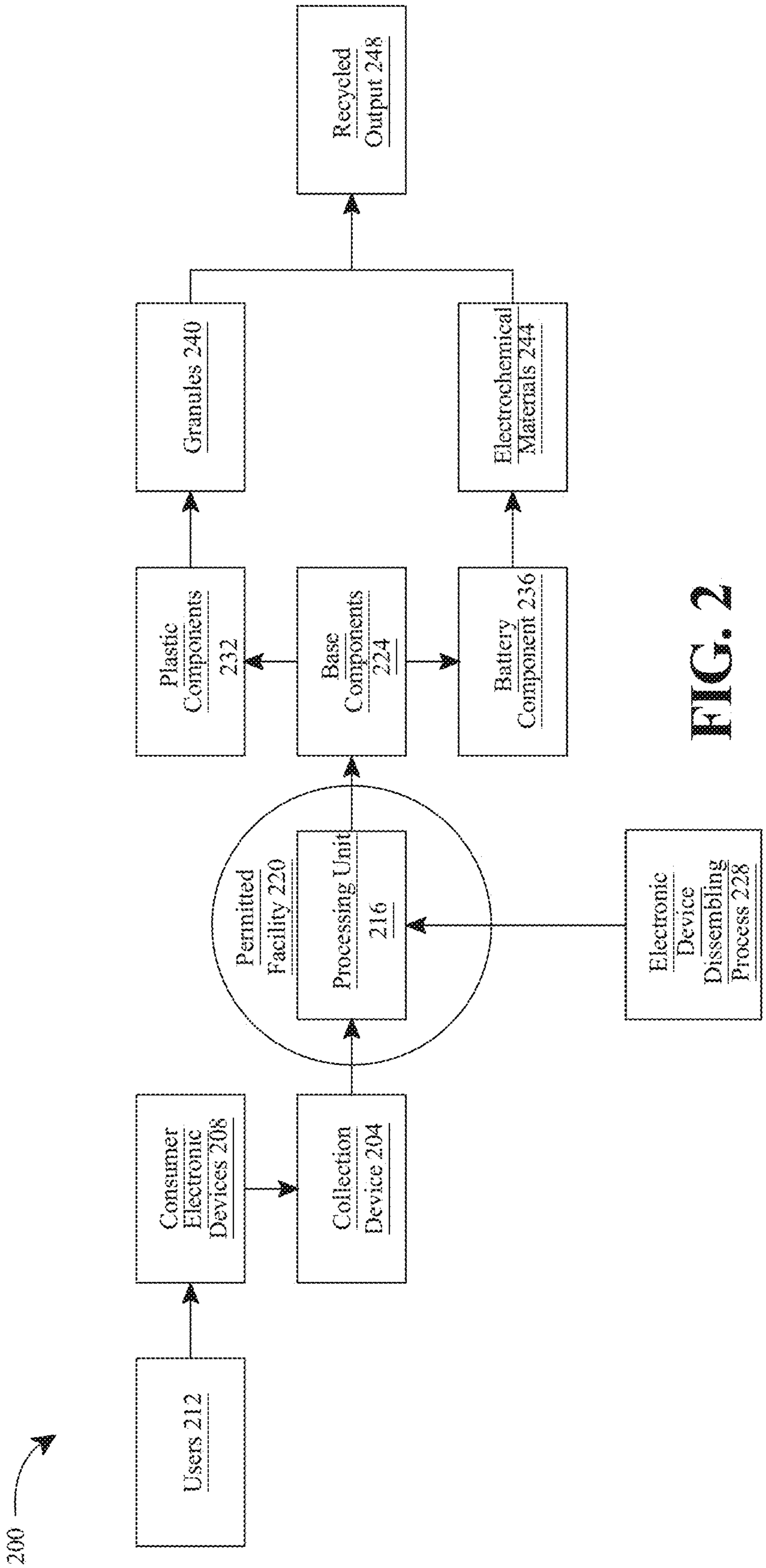
FIG. 2 is a block diagram of an exemplary embodiment of a system for initiating a recycling program of consumer electronic devices.

With continued reference to FIG. 1, reclamation data may be collected from a reclamation process such as the one disclosed with reference to FIG. 2. In some embodiments, electrolyte reclamation data may be collected from the electrochemical material collection process disclosed with reference to FIG. 2. In some embodiments, plastic reclamation data may be collected from the plastic components process disclosed with reference to FIG. 2.

With continued reference to FIG. 1, in some embodiments, processor 104 may retrieve carbon data 116 from a lookup table. A "lookup table," for the purposes of this disclosure, is a data structure, such as without limitation an array of data, that maps input values to output values. A lookup table may be used to replace a runtime computation with an indexing operation or the like, such as an array indexing operation. A lookup table may be configured to pre-calculate and store data in static program storage, calculated as part of a program's initialization phase or even stored in hardware in application-specific platforms. Lookup table may include, for example, initial components 126 and/or successor components 120 correlated to carbon emission values. In some embodiments, lookup table may include materials correlated to carbon emission values. Processor 104 may then multiply the carbon emission value for a material by, e.g., a weight or value of a component to determine a total carbon emission value for the component. In some embodiments, lookup table may include manufacturing processes correlated to carbon emission values. In some embodiments, lookup table may include devices, e.g., initial device 128 and/or successor device 122 correlated to carbon emission values. In some embodiments, lookup table may include various reclamation or disposal processes correlated to carbon emission values.

With continued reference to FIG. 1, in some embodiments, processor 104 may be configured to process plurality of successor carbon data 118. In some embodiments, processing plurality of successor carbon data 118 may include determining a plurality of successor carbon coefficients 144. A "carbon coefficient," for the purposes of this disclosure, is a quantification of carbon emissions relating to a specific component of a device. For the purposes of this disclosure, an "successor carbon coefficient" is a carbon coefficient relating to a specific component of a successor device 122. In some embodiments, each of the plurality of successor carbon coefficients may be correlated to a successor component 120 of the one of more components of the successor device 122

With continued reference to FIG. 1, in some embodiments, processor 104 may be configured to process plurality of initial carbon data 124. In some embodiments, processing plurality of initial carbon data 124 may include determining a plurality of initial carbon coefficients 146. For the purposes of this disclosure, an "initial carbon coefficient" is a carbon coefficient relating to a specific component of an initial device 128. In some embodiments, each of the plurality of initial carbon coefficients may be correlated to an initial component 126 of the one of more initial components 126 of the initial device 128.

With continued reference to FIG. 1, determining carbon coefficients may include calculating carbon coefficients for each component of a device. For example, in some embodiments, processor 104 may look up a component on a lookup table to retrieve a carbon coefficient correlated to that component. In some embodiments, processor 104 may look up a material of a component to retrieve a carbon value associated with that material. That may be converted into a carbon coefficient for a component by multiplying the carbon value by, e.g., a weight or volume of the component. In some embodiments, processor may look up a manufacturing process for the component in a look up table and retrieve a carbon coefficient for the manufacturing process. If the component requires a plurality of manufacturing processes, a processor may add up the carbon coefficients for each manufacturing process to arrive at a carbon coefficient for the component.

With continued reference to FIG. 1, carbon coefficients (successor carbon coefficient 144 and/or initial carbon coefficient 146) may be calculated using a coefficient machine-learning model. Coefficient machine-learning model may be created using a machine-learning module, such as the machine-learning module disclosed in FIG. 5. Coefficient machine-learning model may be consistent with any machine-learning model disclosed in this disclosure. In some embodiments, coefficient machine-learning model may be trained using coefficient training data. Coefficient training data may correlate, for example, exemplary components (e.g., initial components and/or successor components) to exemplary carbon coefficients. Coefficient training data may correlate, for example, exemplary components (e.g., initial components and/or successor components) and carbon data to exemplary carbon coefficients. In some embodiments, coefficient machine-learning model may be configured to receive carbon data 116 and output a carbon coefficient. In some embodiments, coefficient machine-learning model may be configured to receive initial carbon data 124 and output an initial carbon coefficient 146. In some embodiments, coefficient machine-learning model may be configured to receive successor carbon data 118 and output a successor carbon coefficient 144. In some embodiments, coefficient machine-learning model may be iteratively trained using feedback to improve performance.

With continued reference to FIG. 1, processor 104 may be configured to calculate a metric comparison 148. A "metric comparison," for the purposes of this disclosure is a comparison of carbon emissions between an initial device and a successor device using carbon coefficients and a comparison coefficient. Metric comparison 148, in some embodiments, may be a comparison of carbon emission for a lifespan of a device. Methods for calculating metrics in metric comparison 148 are discussed further with respect to FIG. 4.

With continued reference to FIG. 1, calculating metric comparison 148 may include forming a summed initial carbon coefficient, wherein forming the summed initial carbon coefficient comprises summing the plurality of initial carbon coefficients 146. Summing the plurality of initial carbon coefficients 146 may include multiplying each initial carbon coefficient 146 by a corresponding count of the initial component 126 in the initial device. For example, if an initial carbon coefficient 146 for a seal is 5 and there are 5 seals in initial device 128 and an initial carbon coefficient 146 for a mouthpiece is 3 and there is one mouthpiece in initial device 128, then calculating metric comparison may include calculating 5*5+3*1 to get 28.

With continued reference to FIG. 1, in some embodiments, forming a successor device metric may include summing the plurality of successor carbon coefficients. In some embodiments, calculating metric comparison 148 may include forming a summed successor carbon coefficient, wherein forming the summed successor carbon coefficient comprises summing the plurality of successor carbon coefficients 144. Summing the plurality of successor carbon coefficients 144 may include multiplying each successor carbon coefficient 144 by a corresponding count of the successor component 120 in the successor device. For example, if a successor carbon coefficient 144 for a seal is 5 and there are 5 seals in successor device 122 and a successor carbon coefficient 144 for a mouthpiece is 3 and there is one mouthpiece in successor device 122, then calculating metric comparison may include calculating 5*5+3*1 to get 28.

With continued reference to FIG. 1, in some embodiments, successor device metric and initial device metric may include a production metric 156. "Production metric," for the purposes of this disclosure is a value indicating carbon emissions for the production of a device. Calculation of production metric 156 may be identical to calculation of successor device metric and/or initial device metric, except that only carbon emissions attributable to the production of the device/component is used in the calculation.

With continued reference to FIG. 1, in some embodiments, successor device metric and initial device metric may include a transportation metric 158. "Transportation metric," for the purposes of this disclosure is a value indicating carbon emissions for the transportation of a device. Calculation of transportation metric 158 may be identical to calculation of successor device metric and/or initial device metric, except that only carbon emissions attributable to the transport of the device/component is used in the calculation.

With continued reference to FIG. 1, in some embodiments, calculating a metric comparison 148 may include multiplying the summed initial carbon coefficient by the comparison coefficient 160 to form an initial device metric. For example if the summed initial carbon coefficient is 32 and the comparison coefficient is 2 (representing the fact that a successor device has twice the lifespan of initial device) then initial device metric may be 64.

With continued reference to FIG. 1, calculating a metric comparison 148 may include calculating a reclamation metric 150. A "reclamation metric," for the purposes of this disclosure, is a metric that quantifies the carbon emissions relating to the reclamation or recycling of a device. In some embodiments, reclamation metric 150 may indicate carbon emissions saved by the reuse of components of device. In some embodiments, reclamation metric 150 may indicate carbon emissions saved by the reuse of components of device. In some embodiments, reclamation metric 150 may indicate carbon emissions emitted by recycling of device. In some embodiments, reclamation metric 150 may indicate carbon emissions emitted by disposal of device.

With continued reference to FIG. 1, in some embodiments, calculating reclamation metric 150 may include multiplying successor reclamation data 132 by a reclamation threshold 154. In some embodiments, reclamation threshold 154 may be a function of location data 152. For the purposes of this disclosure, a "reclamation threshold" is a value indicating the probability of a device being recycled or reclaimed compared to not recycled or reclaimed. In some embodiments, processor 104 may be configured to retrieve a reclamation threshold 154 using a look up table. For example, lookup table may correlate location data 152 to a reclamation threshold 154. For example, location data 152 may include a locality (such as zip code, area code, city, town, state, country, and the like) and reclamation threshold 154 may be associated with the locality. In some embodiments, location data 152 may include data regarding the recycling or reclamation habits of users within the locality. In some embodiments, location data may include data regarding political leanings of denizens with a locality. In some embodiments, reclamation threshold 154 may be calculated using a reclamation machine learning model. Reclamation machine-learning model may be consistent with any machine-learning model disclosed in this disclosure. Reclamation machine-learning model may be configured to receive as input location data 152 and output reclamation threshold 154. In some embodiments, reclamation machine learning model may be trained using reclamation training data. Reclamation training data may include exemplary location data correlated to exemplary reclamation thresholds. Reclamation training data may include exemplary location data including recycling data correlated to exemplary reclamation thresholds. Reclamation training data may include exemplary location data including political data correlated to exemplary reclamation thresholds. Reclamation thresholds may be expressed as a ratio or percent such as 10%, 20%, 40% and the like.

With continued reference to FIG. 1, in some embodiments, forming successor device metric may include subtracting reclamation metric 150 from the summed plurality of successor carbon coefficients. In some embodiments, forming initial device metric may include subtracting reclamation metric 150 from the summed plurality of initial carbon coefficients.

With continued reference to FIG. 1, processor 104 is configured to generate a comparison coefficient 160 as a function of the successor device 122 and the initial device 128. A "comparison coefficient," for the purposes of this disclosure, is a coefficient that compensates for dissimilar datasets such that a comparison can be made between the datasets. When comparing data, a common issue is that dissimilar datasets make a direct comparison between data sets difficult to impossible. Thus, the calculation of a comparison coefficient is important to allow for the comparison between different datasets. For example, datasets concerning different devices may be very different regarding their carbon emissions. For example, one device may be intended to be used repeatedly for up to 10 years, whereas another may be single use. Or, as another example, one device may require replacement components at occasional intervals, whereas another device may not need replacement components or may be incompatible with replacement components. This makes, for example, comparing the carbon emissions of devices difficult. As such the calculation of a comparison coefficient is necessary to be able to compare the carbon emissions of the devices.

With continued reference to FIG. 1, in some embodiments, comparison coefficient 160 may compensate for a usage capacity of initial device 128 compared to successor device 122. For the purposes of this disclosure, a "usage capacity," is the amount that a device is designed to be used before the device requires replacement. For example, a usage capacity of a coffee pod may be one and the usage capacity of a cup of brewed coffee maybe one; therefore the comparison coefficient 160 for a coffee pod compared to a coffee machine may be 1.

With further reference to FIG. 1, in an embodiment, apparatus 100 may be configured to implement the equation on the right refers to a reference product, to which the same process of summing carbon emissions of components is applied to. Additionally, the equation can also be expanded to include processes of production, transportation, and further $CO_2$ costs as well. However, most importantly the comparison coefficient needs to be established. In an embodiment, apparatus 100 may be configured to determine the comparison coefficient. In a further embodiment, apparatus 100 may be configured to determine the comparison coefficient using a machine learning model. For instance, in the case of coffee capsules with a machine, the comparator product is brewing a cup of coffee by grinding beans, heating water, etc. In that case, the comparison coefficient is 1, as one coffee capsule compares to one cup of brewed coffee. Another example would be electric vehicles, which have been cited to cost more $CO_2$ emissions for manufacturing than regular combustion motor vehicles. However, while the upfront cost is higher and the comparison coefficient is higher, the $CO_2$ emissions of using the combustion motor over time tips the equation in favor of electric vehicle's sustainability in terms of carbon emissions. A third example is an Electronic Nicotine Delivery Device compared to a comparator product of a cigarette. While a cigarette costs 14 g of $CO_2$ emissions an electronic nicotine delivery system costs significantly more $CO_2$ to manufacture. However, the comparison coefficient depends on the end-user's usage behavior, and in the case of ENDS, the quantity of the active ingredient nicotine delivered in ENDS versus cigarettes. For example, an ENDS with 80 mg nicotine would compare to 80 cigarettes with an average nicotine delivery of 1 mg per unit. Thus, the coefficient of 80 needs to be used to compare the two products accurately. This equation highlights that as long the reference product has a higher $CO_2$ emission either on an individual basis or as an accurate comparison with an established comparison coefficient, the new product is more environmentally sustainable. From a product development perspective, this can be helpful for companies to understand their footprint and optimize the product to decrease the net emissions. Further from a regulatory or taxation perspective, this analysis and approach can be helpful in authorizing more sustainable products or taxing products according to their relative $CO_2$ emissions. Companies can benefit from a marketing perspective to consumers, as they can base claims on data that product 1 is X times or Y % more sustainable than product 2.

With continued reference to FIG. 1, processor 104 may be configured to determine a comparison coefficient 160 using a lookup table. For example, lookup table may contain entries correlating devices to comparison coefficients 160. Processor 104 may lookup a comparison coefficient 160 in lookup table using device. For example, lookup table may contain entries correlating device components to comparison coefficients 160 for those device components. In some embodiments, processor 104 may average a plurality of comparison coefficients 160 for components of a device to determine an overall comparison coefficient 160 for the device.

With continued reference to FIG. 1, processor 104 may use a comparison machine-learning model 162 to generate comparison coefficient 160. Comparison machine-learning model 162 may be created using a machine-learning module, such as the machine-learning module disclosed in FIG. 5. Comparison machine-learning model 162 may be consistent with any machine-learning model disclosed in this disclosure. In some embodiments, comparison machine-learning model 162 may be trained using comparison training data 164. Comparison training data 164 may correlate, for example initial device data and successor device data to comparison coefficients. In some embodiments, comparison machine-learning model may be configured to receive successor device data and initial device data and output a comparison coefficient 160. In some embodiments, comparison machine-learning model may be iteratively trained using feedback to improve performance.

With continued reference to FIG. 1, processor 104 is configured to display, using a graphical user interface (GUI) 166, a carbon report 168 as a function of successor carbon data 118, initial carbon data 124, and comparison coefficient. A “carbon report,” for the purposes of this disclosure is a collection of information discussing the carbon impact of a successor device compared to an initial device. Carbon report 168 may include, e.g., metric comparison 148. In some embodiments, metric comparison 148 may include a comparison between the initial device metric and the summed successor carbon coefficient. Carbon report 168 may include comparison coefficient 160. In some embodiments, GUI 166 may be configured to display metric comparison 148. In some embodiments, GUI 166 may be configured to display comparison coefficient 160. In some embodiments, GUI 166 may be configured to display one or more elements of metric comparison 148 as discussed with reference to FIG. 4.

With continued reference to FIG. 1, in some embodiments, GUI 166 may include a GUI data structure 170. A “GUI data structure,” for the purposes of this disclosure, is a data structure that configures a display device to display a GUI. In some embodiments, processor 104 may generate GUI data structure 170 and transmit it to a display device. In some embodiments, GUI data structure 170 may include one or more event handlers 172. An “event handler,” for the purposes of this disclosure is an element of computer software that is configured to perform an action upon the occurrence of an event. In some embodiments, GUI data structure 170 may include one or more event listeners. An “event listener,” for the purposes of this disclosure is an element of computer software that is configured to detect the occurrence of an event. As a non-limiting example, an event lister may be configured to listen for the user to press an “update” button, then an event handler 172 may be configured to regenerate metric comparison as a function of the detection of the update button press.

With continued reference to FIG. 1, Apparatus 100 may be configured to create an effective and universal recycling framework guided by consumer habits, real-world limitations, and a pragmatic approach to overcome current low re/upcycling rates in consumer markets. This could be achieved by a four-tiered research approach to recycling. For example a first tier may be a landscape review in at least seven countries of ENDS recycling, highlighting industry participants, described by comparison to other FMCG industries recycling practices (e.g. Nespresso consumer capsules) including overall collection rates/recycling rate of ENDS in each of the seven research countries. A second tier may be a quantitative and qualitative web-based baseline survey on end-consumer examining differences in recycling habits of ENDS per jurisdiction, recycling habits in general, and the propensity of end users in each of the seven research countries to use different options (government organized recycling, private company receptacles, private company direct-to-consumer (DTC) bags, disposing in regular waste if a public-private partnerships exists for recycling of ENDS to be handled) as well as the propensity of combustion tobacco users to switch to ENDS before and after implementation of a recycling program. A third tier may be a quantitative and qualitative case study examining consumer habits and pain points in boosting collection rates in urban and rural communities, including implementation of receptacles in physical locations that sell ENDS to examine the impact on collection rates, implementation of a “bottle-deposit” type scheme to examine the impact on collection rates, education on a web-based platform on accessibility to physical ENDS recycling receptacles and environmental harm of disposal, and importance of sustainability as a driver of purchasing preference e.g. changes on velocity of ENDS product sales with recycling program. A fourth tier may be findings from the first two points will be used to create a Recycling Model Framework using findings and best practices from this research proposal.

Still referring to FIG. 1, an exemplary research jurisdiction is a selection from the following 10 jurisdictions—South Africa, Indonesia, United States, United Kingdom, France, Germany, Italy, Poland, Switzerland, and Canada, and United Arab Emirates. This is to investigate a mix of LMICs and HICs in which ENDS are legal.

With continued reference to FIG. 1, apparatus 100 may be configured to assess the environmental and social impact of manufacturing process of Synthetic Nicotine as compared to Tobacco-Derived Nicotine, assess the overall environmental impact of ENDS vs cigarettes (finished good, average emissions by market share if available or reference product), establish a landscape review of current ENDS recycling practices across different countries and a Recycling Index for research jurisdictions, create a baseline survey to identify variables linked to ENDS recycling rates, propensity to recycle, monetary incentives, such as distance to receptacle, etc., the impact of a “vape-deposit” scheme, and educational support related to recycling in both rural and urban retail environments, and disseminate research findings and model framework recommendations to governments and industry groups globally.

Continuing to refer to FIG. 1, apparatus 100 may be configured to quantify the sustainability of the ENDS supply chain from cradle-to-grave and from cradle-to-cradle referencing upcycling methodologies. A first subsection of the supply chain may be manufacturing and extraction of the active Ingredient (Nicotine). For example, there is a need to quantify the social and environmental impact of tobacco-derived nicotine (TDN) manufacturing and synthetic nicotine (SyN) manufacturing. There are multiple patented methods of synthesizing the s-nicotine isomer, and there is a need to examine at least one of the two most distinct methods to compare them with each other, and vis-à-vis TDN manufacturing. A second subsection of the supply chain may be an entire ENDS Product. For example, environmental impact of ENDS disposal/usage based on chemical Ingredients used in E-liquid: propylene glycol, vegetable glycerin, various acids, and flavoring ingredients, including nicotine from earlier phase. While various chemical compositions exist, common ratios and chemical ingredients for manufacturers reflecting market share in the key research jurisdictions can be chosen to ease calculations. Estimates based on existing disclosures of manufacturers (e.g. marketing materials), scientific literature (e.g. testing of e-liquids) or regulatory decisions, will be used to find the closest approximation. Further, the disposal of ENDS hardware: plastics, metals, organic materials such as cotton, and LI batteries, and packaging, will be considered. While ENDS hardware can be variable in construction, estimates based on market practices will limit the analysis to commonly used materials in proportion of their use with reference products chosen. This analysis will compare cradle-to-gate, cradle-to-grave (disposal, landfill), and cradle-to-cradle (reusing components). Estimates based on existing disclosures of manufacturers (e.g. mAh of battery in leaflet), PMTA decisions, or in house analysis (analyzing products such as seeing what types of batteries are used) will be conducted to approximated. Additionally, by establishing the environmental impact of each category of ENDS and summing up the different types of ENDS to sales data in key research jurisdictions identified, the overall environmental burden per year per country can be calculated for each category of ENDS, and for the entirety of ENDS. Importantly, this simulation extends to consider re-/upcycling schemes to determine the environmental impact of ENDS should tier-ed thresholds (e.g. 20%) of recycling schemes be adopted. This finding will be important to highlight the call to action for various governments in the dissemination of the model recycling framework.

With continued reference to FIG. 1, apparatus 100 may be configured to conduct this Environmental Footprint Analysis as a Life Cycle Assessment (LCA) to examine the following parameters for the manufacturing for at least one of CNT TDN, CNT SyN, Zanoprima SyN (per cigarette/ENDS product and per ton of nicotine), as well as entire ENDS products per category including hardware and LI battery. The LCA analysis will output a carbon value, or carbon cost, created by manufacture of the product. In an embodiment, this will include ingredients and Materials Supply Chain Analysis for each step of each manufacturing process (creation, farming, mining, etc. of raw materials (e.g. lithium), alteration of raw materials into components (e.g. making PCTG plastics into a component), and assembly (putting components together)) such as water depletion, water usage required and wastewater created to produce one defined unit, energy used for production, transportation to facilities, mass and disposal of toxic materials, land use, including deforestation required, production of Solid Waste, overall carbon emissions, CO2 Emissions, human toxicity, natural land transformation, and others such as terrestrial acidification, fossil fuel depletion, marine toxicity, as per LCA.

Still referring to FIG. 1, on the Social Impact Analysis, the variables include the above and furthermore include agricultural, farmer livelihood and health, agrochemical use and consequences, and deforestation/Land Degradation Continuing to refer to FIG. 1, apparatus 100 may examine qualitative and quantitative literature pertaining to the human-rights violations of tobacco cultivation that has reportedly ended up in the supply chains of certain commercial ENDS and pharmaceutical NRT manufacturers. Existing literature on cigarettes can be cited for TDN to understand various environmental and social metrics including agricultural, carbon emissions, solid waste, wastewater, packaging, and transportation. Because there is no existing published literature relating to the environmental impact of synthetic nicotine, the carbon emissions, production of solid waste, and production of wastewater for 1 gram of synthetic nicotine will be quantified by working with manufacturer.

Still referring to FIG. 1, apparatus 100 may not address the emissions resulting from the use of ENDS (i.e., exhaled vapor impact) in comparison to smoke and side stream emissions from cigarettes as this is not in scope. The study of air quality following ENDS use has been studied previously (see existing knowledge base).

Now referring to FIG. 2, a block diagram of an exemplary embodiment of a system 200 for initiating a recycling program of consumer electronic devices. As used in this disclosure, a "recycling program" refers to an organized strategy or initiative designed to collect, process, and convert waste materials into new products or raw materials, thereby reducing the need for virgin resources, minimizing environmental impact, and conserving energy. In an embodiment, recycling programs aim to reduce the amount of waste sent to landfills and incinerators, prevent pollution, and support sustainable practices by promoting the reuse of materials. In some cases, recycling programs may include any processing step and/or combination of processing steps as described in this disclosure below.

With continued reference to FIG. 2, system 200 includes a collection device 204 configured to collect a plurality of consumer electronic devices 208 from users 212. As used in this disclosure, a "collection device" is a device or apparatus used for the purpose of gathering, accumulating, or otherwise receiving a variety of consumer electronic devices 208 from users 212. In an embodiment, collection device 204 may serve as an initial point of contact e.g., receptacle or gathering point in recycling program as described herein, ensuring plurality of consumer electronic devices 208 are collected in an organized manner before they are sent for further processing as described below.

With continued reference to FIG. 2, in some cases, collection device 204 may be designed as a standalone unit, like a kiosk or bin, which may be placed in strategic locations such as an outlet e.g., local retail stores, electronic stores, community centers, recycling centers. In an embodiment, collection device 204 may be equipped with compartments or slots to accommodate different types of electronic devices as described herein.

With continued reference to FIG. 2, "consumer electronic devices (CED)," for the purpose of this disclosure, refers to any device that is designed for regular use by users 212 that is powered by electricity. “Users,” as described herein, refers to individuals or entities who interact with, operate, or utilize plurality of CEDs 208. In a non-limiting example, users 212 may include individuals who purchase and use one or more CED. In another non-limiting example, users 212 may include individuals who avail or benefit from the recycling program as described herein such as the general public. In a further non-limiting example, users 212 may include employees or departments at permitted facility as described in detail below.

With continued reference to FIG. 2, in some cases, plurality of CEDs 208 may include a broad range of products, from handheld gadgets to larger appliances, intended for everyday use for entertainment, communication, office productivity, and/or the like. Plurality of CEDs 208 may be designed for purchase and utilization by the general public. In other cases, plurality of CEDs 208 may be characterized by their portability, user-friendliness, and functionality, often integrating advanced technologies to enhance user experience. In a non-limiting example, CEDs 208 may include aerosol delivery devices such as electronic cigarettes, inhalers, and air fresheners. Exemplary aerosol delivery device is described in detail below with reference to FIG. 3.

With continued reference to FIG. 2, other exemplary embodiments of CEDs 208 may include, without limitation, televisions, radios, gaming consoles, DVD players, home theater system, smartphones, landline phones, smartwatches, desktop computers, laptops, tablets, e-readers, MP3 players, camcorders, digital cameras, drones, microwaves, washing machines, refrigerators, smart glasses, VR headsets, and/or the like. As an ordinary person skilled in the art, upon reviewing the entirety of this disclosure, will be aware of various CEDs that may be collected by collection device 204 of system 200 as described herein.

With continued reference to FIG. 2, plurality of CEDs 208 may include electronic waste (E-waste), wherein “E-waste,” for the purpose of this disclosure, refers to discarded electronic or electrical devices or parts/components thereof. In some cases, E-waste may include any CED as listed above that are no longer functional, wanted, or have reached the end of their useful life. Due to the presence of toxic substance (e.g., lead, mercury, cadmium, brominated flame retardants, and/or the like) in many electronic devices, improper disposal of e-waste may lead to environmental pollution and potential health risks.

With continued reference to FIG. 2, system 200 includes a processing unit 216 at a permitted facility 220, communicatively connected to collection device 204 as described herein. As used in this disclosure, a “processing unit” refers to an entity situated within permitted facility 220 that is equipped and capable of executing instructions, managing operations, and/or processing data related to recycling program as described herein. As non-limiting examples, entity may include a machine or trained professional. In an embodiment, processing unit 216 may include a central component in system 200, responsible for core processing steps as described in detail below that transform discarded electronics devices, e.g., plurality of CEDs 208 into reusable materials or new products.

With continued reference to FIG. 2, as described herein, “communicatively connected” refers to the establishment of a link or channel of communication between two or more components, devices, systems, or entities, in this case, collection device 204 and processing unit 216. Such connection may allow for a transfer, exchange, or relay of information, data, or signal between two parties, ensuring coordinated and informed operations as described below.

With continued reference to FIG. 2, in some cases, processing unit 216 may include one or more sophisticated machine designed for specific task involved in recycling program e.g., disassembling and processing plurality of CEDs. Alternatively, processing unit 216 may include a trained professional who possesses the skills and knowledge to manually disassemble devices and process plurality of CEDs 208.

With continued reference to FIG. 2, a “permitted facility,” for the purpose of this disclosure, refers to a designated location or establishment that has been officially authorized, licensed, or approved by relevant regulatory bodies or authorities to carry out one or more processing steps as described herein. In some cases, permitted facility 220 may operate in compliance with local, regional, or national regulations and standards related to electronic waste management, ensuring that the facility adheres to best practices and meets the necessary safety and environmental standards.

With continued reference to FIG. 2, permitted facility 220 may undergo a rigorous evaluation process involving 1) submitting an application to relevant regulatory body detailing the facility’s operations, equipment, and safety protocols; 2) undergoing inspections to ensure that the facility meets the required standards; 3) demonstrating the capability to handle CEDs in a manner that minimizes environmental impact and ensure worker safety; and 4) grant a permit or license to operate for the facility once all requirements have been met.

With continued reference to FIG. 2, exemplary permitted facility 220 may include, without limitation, E-stewards certified recyclers, responsible recycling (R2) certified facilities, waste electrical and electronic equipment (WEEE) authorized treatment facilities, state, or country-specific permitted facilities, among others.

With continued reference to FIG. 2, in some cases, processing unit 216 located within permitted facility 220 as listed above may include, without limitation, shredding machines, automated sorting lines, manual disassembly stations, chemical processing tanks, plastic granulating machines, metal recovery systems, and/or the like.

With continued reference to FIG. 2, in a non-limiting example, processing unit 216 may include one or more computing devices or processors e.g., a server. Computing device may include a processor communicatively connected to a memory. Exemplary embodiments of computing device may include, any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device.

With continued reference to FIG. 2, In some cases, network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication.

With continued reference to FIG. 2, in general, any network topology may be used. Information (e.g., data, software etc.) may be communicated to and/or from a computer and/or a computing device. Processing unit 216 may include a server having, but is not limited to, for example, a computing device or cluster of computing devices in a first location and a second computing device or cluster of computing devices in a second location. Server may include one or more computing devices dedicated to data storage, security, distribution of traffic for load balancing, and the like. Processing unit 216 may distribute one or more computing tasks as described below across a plurality of computing devices of different system components such as specialized machines within permitted facility 220 as described above, which may operate in parallel, in series, redundantly, or in any other manner used for distribution of tasks or memory between computing devices. Computing device of processing unit 216 may be implemented, as a non-limiting example, using a "shared nothing" architecture.

With continued reference to FIG. 2, processing unit 216 may be designed and/or configured to perform any method, method step, or sequence of method steps in any embodiment described in this disclosure, in any order and with any degree of repetition. For instance, computing device of processing unit 216 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks.

With continued reference to FIG. 2, processing unit 216 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 2, as used in this disclosure, in some cases, communicative connection between collection device 204 and computing device of processing unit 216 at permitted facility 220 may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. In a non-limiting example, data related to collected plurality of CEDs 208 e.g., quantity, date of collection, user information, device condition, and/or the like may be transmitted, from collection device 204 to computing device of processing unit 216. Similarly, data such as server response, processing status, estimated completion time, and/or any potential issues or alerts may be sent from computing device of processing unit 216 to collection device 204 disposed at outlet. System 200 may be consistent with any recycling system disclosed in U.S. Non-provisional application Ser. No. 18/370,380, filed on Sep. 19, 2023, and entitled "METHODS FOR RECYCLING AND UPCYCLING CONSUMER ELECTRONICS WITH PLASTICS AND INTEGRATED BATTERIES," the entirety of which is incorporated herein by reference.

With continued reference to FIG. 2, communicative connection described herein may further include electrically coupling or connecting at least an output of one device, component, or circuit to at least an input of another device, component, or circuit. For example, and without limitation, via a bus or other facility for intercommunication between collection device 204 and processing unit 216 as described herein. In some instances, the terminology "communicatively coupled" may be used in place of communicatively connected in this disclosure.

With continued reference to FIG. 2, in a non-limiting embodiment, upon collection of at least one CED from Plurality of CEDs 208, system 200 may be configured to generate at least one token. As used in this disclosure, a "token" refers to a digital representation of user's contribution to the recycling initiative. In a non-limiting example, generation of at least a token may include provide a tangible recognition of users' eco-friendly actions, thereby encouraging continued participation. In some cases, contribution e.g., depositing at least one CED, may be quantified, by system 200, such as collection device 204 and/or processing unit 216 (and computing devices thereof) by calculating a reward as a function of detected quantity of deposited CEDs 208, CED types, deposition timestamp, location of collection device (e.g., outlet location), among others. In some cases, rewarding of at least a token to users 212 may introduce a gamification element to recycling process as described herein. Users 212 may accumulate rewarded token over time, potentially exchanging tokens for various benefits including, without limitation, discounts on certain products, priority services, or even monetary benefits.

With continued reference to FIG. 2, in some cases, at least a token may include a Non-Fungible Token (NFT). As used in this disclosure, an "NFT" are unique digital assets verified using blockchain technology as described in detail below with reference to FIG. 9. In an embodiment, each NFT may represent a specific recycled CED, capturing one or more attributes, history, origin, and/or any device related data of the specific recycled CED. The use of NFTs may ensure that every collected and/or recycled CED of plurality of CEDs 208 may be individually acknowledged (by processing unit 216). In a non-limiting example, users 212 may be able to view or showcase their collection of rewarded NFTs, reflecting their personal contribution to environmental conservation.

With continued reference to FIG. 2, rewarded NFTs may be posted on an immutable sequential listing associated with user. As used in this disclosure, an "immutable sequential listing" is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. Additionally, or alternatively, NFTs may be traded e.g., sold or rented between users 212. In a non-limiting example, NFT may represent a recycling of a rare or vintage electronic device my become a sought-after digital collectible, further promoting the recycling program as described herein. Immutable sequential listing is described in further detail below with reference to FIG. 9.

With continued reference to FIG. 2, in a non-limiting example, collecting aerosol delivery device as described below may include receiving, retrieving, or otherwise recognizing a unique identifier of the collected aerosol delivery device (via near-filed communication technology [NFC]), and device manufacture data may be further retrieved by processing unit 216 based on the unique identifier. Using this specific example, the Consumer Electronic devices 208 may include NFC-enabled devices with a unique ID may be brought back to a collection device 204, tapped on an NFC reader for the capturing of the unique ID, and placed in the collection receptacle for exchange of a deposit for returning the product. At least a token, including NFT as described above, may be generated as a function of unique identifier and/or device manufacture data, and distributed (e.g., send via various communication protocols described herein) to user devices affiliated with users 212. Unique identifier, NFC technology, and device manufacture data described herein may be consistent with any unique identifier, NFC technology, and object manufacture data disclosed in U.S. patent application Ser. No. 18/211,726, filed on Jun. 20, 2023, and entitled "APPARATUS AND METHOD FOR UNIQUE IDENTIFICATION OF AN OBJECT USING NEAR-FILED COMMUNICATION (NFC)," in which its entirety is incorporated herein by reference.

With continued reference to FIG. 2, processing unit 216 at permitted facility 220 is configured to disassemble each CED of plurality of CEDs 208 into a plurality of base components 224 As used in this disclosure, "base components" are fundamental, primary, or otherwise essential parts or elements that make up CED described herein. In an embodiment, base components 224 may include one or more components that are results of the initial disassembly or breakdown of a given CED such as aerosol delivery device as described in detail below with reference to FIG. 3.

With continued reference to FIG. 2, in some cases, each base component of plurality of base components 224 may include a specific function. In a non-limiting example, base components 224 may include circuit boards, structural units, display units, batteries, connectors and ports, semiconductors, optical components, speakers and microphones, and/or the like. Other exemplary based components are described in detail below with reference to FIG. 3.

With continued reference to FIG. 2, plurality of base components 224 is disassembled through an electronic device dissembling process 228. A "electronic device disassembling process," for the purpose of this disclosure, refers to a systematic procedure or set of steps undertaken to break down or dismantle CEDs 208 into base components 224 In some cases, electronic device disassembling process 228 may intake a single CED each time, ensuring precision and care in the disassembly of the CED. In other cases, multiple CEDs, such as a batch of similar CEDs or components thereof, may be processed simultaneously via electronic device disassembling process 228. In a non-limiting example, processing unit 216 may include an automated machine equipped with a plurality of sensors and robotic arms may be used to methodically disassemble plurality of CEDs 208 according to implemented electronic device disassembling process 228. In another non-limiting example, a trained personnel, such as a technician or an E-waste specialist, may be employed to manually disassemble plurality of CEDs 208 into plurality of base components 224.

With continued reference to FIG. 2, electronic device disassembling process 228 (besides manual disassembly) may include, without limitation, shredding, heat treatment, chemical treatment, desoldering, ultrasonic cleaning, magnetic separation, air separation, component testing, component salvaging, data destruction, and/or the like. As an ordinary person skilled in the art, upon reviewing the entirety of this disclosure, may be aware of various embodiments of electronic device disassembling process may be employed by processing unit 216 at permitted facility 220.

With continued reference to FIG. 2, disassembled plurality of base components 224 includes a plurality of plastic components 232. As used in this disclosure, "plastic components" refers to parts or elements of CEDs that are (primarily) made of plastic materials regardless of the size, shape, function, and/or the like. In a non-limiting example, plurality of plastic components 232 of CEDs 208 as described herein may include, but are not limited to, casings and housings, buttons and keypads, insulations (e.g., plastic coating, sheath, and/or the like), connectors and ports, display frames, mounts and stands, protective covers, internal components (e.g., plastic holders, clips, brackets, and/or any other internal components help keep other components in place), and/or any other accessories.

With continued reference to FIG. 2, exemplary plastic materials may include, without limitation, Polyethylene (PE, including Low-Density Polyethylene [LDPE], High-Density Polyethylene [HDPE], and Linear Low-Density Polyethylene [LLDPE]), Polypropylene (PP), Polyvinyl Chloride (PVC, including, Rigid PVC [uPVC] and Flexible PVC), Polystyrene (PS, including General Purpose Polystyrene [GPPS] and High Impact Polystyrene [HIPS]), Polyethylene Terephthalate (PET), Polybutylene Terephthalate (PBT), Polycarbonate (PC), Polyurethane (PU), Polyacrylonitrile (PAN), Polyvinylidene Fluoride (PVDF), Polyvinyl Alcohol (PVA), Polytetrafluoroethylene (PTFE), Polymethyl Methacrylate/Acrylic/Plexiglas (PMMA), Polyoxymethylene/Delrin (POM), Polyether Ether Ketone (PEEK), Polyphenylene Sulfide (PPS), Polyphenylene Oxide (PPO), Polysulfone (PSU), Polyimide (PI), Polyamide/Nylon (PA), Polyethylene Naphthalate (PEN), Polybutadiene (PBD), Polyisoprene (PIR), Polyvinyl Acetate (PVAc), Polyvinyl Butyral (PVB), Polychlorotrifluoroethylene (PCTFE), Polyvinylpyrrolidone (PVP), Ethylene-Vinyl Acetate (EVA), Ethylene Propylene Diene Monomer (EPDM), Thermoplastic Elastomers (TPE), Thermoplastic Polyurethane (TPU), Thermoplastic Olefin (TPO), Liquid Crystal Polymers (LCP), Polyaryletherketone (PAEK), Polyetherimide (PEI), among others.

With continued reference to FIG. 2, it should be noted that the plastic materials listed above are by no means exhaustive, as other specialized and blended plastic materials are available, such as, without limitation, acrylonitrile butadiene styrene (ABS), a blend of polycarbonate and ABS plastic (PC/ABS), and/or Poly Cyclohexylenedimethylene Terephthalate glycol-modified (PCT-G), and/or the like. As an ordinary person skilled in the art, upon reviewing the entirety of this disclosure, may be aware of various base components may be recognized, by processing unit 216, as plastic components 232. Other exemplary embodiments of plastic components 232 are described in detail below with reference to FIG. 3.

With continued reference to FIG. 2, disassembled plurality of base components 224 also includes at least a battery component 236. As used in this disclosure, a "battery component" is a part or element of a CED that stores energy in a chemical form and releases it as electrical energy to power the CED. In a non-limiting example, at least a battery component 236 may include one or more power sources such as one or more batteries that allow CEDs to function as desired. Batteries may power a plurality of CEDs 208 from tiny hearing aids to large electric vehicles. Battery component 236 may be configured to convert stored chemical energy into electrical energy through electrochemical reactions.

With continued reference to FIG. 2, in an embodiment, at least a battery component 236 may include an anode (i.e., negative electrode), a cathode (i.e., positive electrode), an electrolyte, and a separator. In a non-limiting example, at least a battery component 236 may include, without limitation, Lithium-ion (Li-ion) battery, Nickel-Cadmium (NiCd) battery, Nickel-Metal Hydride (NiMH) battery, Alkaline battery, Lead-Acid battery. In some cases, at least a battery component 236 may come in various shapes and sizes such as, without limitation, cylindrical cells (e.g., AA or 18650), flat pouch cells, prismatic cells and/or the like.

With continued reference to FIG. 2, additionally, or alternatively, at least a battery component 236 may include various means of protection mechanisms. For instance, and without limitation, modern batteries, such as Li-ion battery, may come with built-in protection circuits to prevent overcharging, over-discharging, and overheating, and/or the like to ensure safe operation in CEDs. In some cases, at least a battery component 236 may include positive and negative terminals, which provide electrical connection to CED. In other cases, battery components 236 may include different energy Density and/or capacity (i.e., amount of energy a battery can store relative to its volume or weight). In a non-limiting example, a battery component that has a higher energy density may store more power in a smaller or lighter package.

With continued reference to FIG. 2, exemplary embodiments of battery component 236 may include, without limitations, removable batteries, integrated batteries, flexible batteries, thin film batteries, among others. As an ordinary person skilled in the art, upon reviewing the entirety of this disclosure, will be aware of various types of battery component 236 may be disassembled from plurality of CEDs 208. At least a battery component 236 is further described below with reference to FIG. 3.

With reference to FIG. 2, processing unit 216 at permitted facility 220 is configured to process plurality of base components 224, including, without limitation, plurality of plastic components 232 and battery components 236 as described above. In an embodiment, processing plurality of base components 224 includes disintegrating plurality of plastic components 232 into a plurality of granules 240. As used in this disclosure, "disintegrating" means a processing step or a set of processing steps for reducing the physical size of plastic components 232 through mechanical, thermal, or otherwise chemical means to create smaller, uniform units or pieces refer to "granules." In some embodiments, disintegrating plastic components 232 into granules 240 may involve processes such as, without limitation, shredding, grinding, melting, or even using solvents, to break down larger plastic structures into more manageable particles with consistent sizes, facilitating further processing or recycling as described below.

With continued reference to FIG. 2, in some cases, granules 240 may include round or irregularly shaped particles or fragments resulting from the disintegration process as described above. In a non-limiting example, plurality of granules 240 may range in size from a few micrometers to several millimeters, depending on different processing method as described herein. In a non-limiting example, granules 240 may intended for injection molding may be smaller and more uniform than those meant for bulk recycling.

With continued reference to FIG. 2, in a non-limiting example, plurality of plastic components 232 may be shredded, using processing unit 216 including single-shaft shredder, dual or twin-shaft shredder, four-shaft shedder, hammermill, and/or the like to pulverize the input plastic components. Such process may reduce the size and volume of plastic components 232, making them easier to transport, store, or process further as described in further detail below.

With continued reference to FIG. 2, in some embodiments, processing plurality of plastic components 232 may include sorting, upon receiving plurality of plastic components 232, based on type such as, without limitation, PET, HDPE, PVC, and/or colors. In some cases, sorting may be done manually; however, one or more automated systems e.g., systems including infrared sensors or flotation methods may be employed by processing unit 216 to sort plurality of plastic components 232. It should be noted that plurality of plastic components 232 do not have to be separated by type but are ground up into a mix.

With continued reference to FIG. 2, embodiments described herein may allow for base components 224 e.g., plurality of plastic components 232 with toxic chemicals (e.g., a residue of nicotine) in the context of plurality of aerosol delivery devices as plurality of CEDs 208 are being collected and recycled. Furthermore, identified components 232 with toxic chemicals and residual nicotine can be treated by UV light or H2O2, to further the oxidative degeneration for nicotine, and mitigate a hazardous waste nature of certain components. In a non-limiting example, processing unit 216 may be configured to identify and segregate devices containing such toxic residues through various sensors, visual inspection systems, user prompts, and/or the like. Other potential contaminants or residues from aerosol delivery devices may include flavoring agents, solvents, or other chemicals as described in further detail below.

With continued reference to FIG. 2, processing plurality of base components 224 especially plastic components 232 may also include cleaning plurality of base components 224 In some cases, cleaning may be a pivotal step in the recycling process described herein, ensuring base components 224 such as plastic components 232 are free from contaminants, residues, and/or foreign materials as described above before it undergoes further processing. In a non-limiting example, plurality of plastic components 232 may undergo preliminary rinse to remove loose dirt, dust, and other superficial contaminants. In some cases, plurality of plastic components 232 may be immersed in a solution containing one or more detergents or surfactants to remove oily or greasy residues. Targeted cleaning may be initiated, by processing 116, for plastic components 232 that have specific contaminants, such as identified nicotine residues or other chemical residues as described above, in which processing unit 216 may release targeted cleaning agents or solvents to neutralize or remove these specific contaminants (without harming plastic materials).

With continued reference to FIG. 2, alternatively, thermal cleaning may be employed for more stubborn contaminants, for example, and without limitation, plurality of plastic components 232 may be subjected to controlled heating, thereby softening, or melting certain residues. Ultrasonic cleaning may also be used by processing unit 216, as an advanced cleaning method, in which ultrasonic waves in a cleaning solution create micro-bubbles. When these bubbles collapse, a strong cleaning action (i.e., cavitation) may be produced that can remove microscopic contaminants from plastic component surface (even intricate geometries or head-to-reach areas). Subsequent rinsing (with water) and drying (e.g., air drying, thermal draying, vacuum drying, and/or the like) may ensure the complete removal of loosened contaminants and moisture from plastic components 232.

With continued reference to FIG. 2, further, processing unit 216 at permitted facility 220 may further include a mechanical device or machine used to shape, form, and/or produce materials by pushing or forcing input materials through an inlet (e.g., a die or nozzle) such as, without limitation, an extruder, configured to melt and form plurality of plastic components 232 into a consistent shape granules 240. Disintegrating plurality of plastic components 232 may further include pelletizing, i.e., cutting the produced material into granules 240 that may be then cooled and solidified. Plurality of granules 240 may be used as raw material for producing recycled output as described below.

With continued reference to FIG. 2, additionally, processing plurality of base components 224 further includes decomposing at least one battery component 236 into a plurality of electrochemical materials 144. As used in this disclosure, "decomposing" means breaking down at least one battery components 124 into its constituent materials through a combination of mechanical, chemical, and/or thermal process such as, without limitation, hydro-to-cathode, as described in detail below. In some cases, electrochemical materials may include valuable metals, without limitation, Lithium, Cobalt, Nickel, Manganese, copper, aluminum, lead, and/or the like. In another non-limiting example, electrochemical materials 144 may further include electrolytes and separators.

With continued reference to FIG. 2, processing unit 216 at permitted facility 220 is configured to generate a recycled output 248 using processed plurality of base components 224 as described above. As used in this disclosure, a "recycled output" refers to a product or material that is derived from "recyclets" such as, without limitation, plurality of granules 240 and electrochemical materials 144 as described above. Exemplary embodiments of recycled output 248 may include, without limitation, recycled plastic pellets, reclaimed metals, compost, recycled paper, refurbished electronics, recycled rubber, reprocessed glass, and/or the like. As an ordinary person skilled in the art, upon reviewing the entirety of this disclosure, may be aware of various recycled output 248 generated by processing unit 216 at permitted facility 220.

With continued reference to FIG. 2, in an embodiment, recycled output 248 may be tangible; for instance, and without limitation, recycled output may include a newly molded plastic product made from plurality of granules 240, a refurbished electronic device using reclaimed electrochemical materials, or even a composite material that combines multiple recyclets to from a new type of building material for fabric. In a non-limiting example, recycled output 248 generated by processing unit 216 may include a plurality of building material such as roof shingles and bricks. In another non-limiting example, recycled output 248 generated by processing unit 216 may include one or more new batteries, as described in detail below with reference to FIG. 6.

With continued reference to FIG. 2, in another embodiment, recycled output 248 may be intangible; for instance, and without limitation, data related to recycled output 248 may include saved energy or reduced carbon footprint resulting from the recycling process as described herein compared to the production of new materials. In a non-limiting example, recycled output 248 may represent an environmental benefits and efficiencies gained from the said recycling process, such as reduced greenhouse gas emissions, conservation of natural resources, or the prevention of waste accumulation in landfills.

Figure 3:
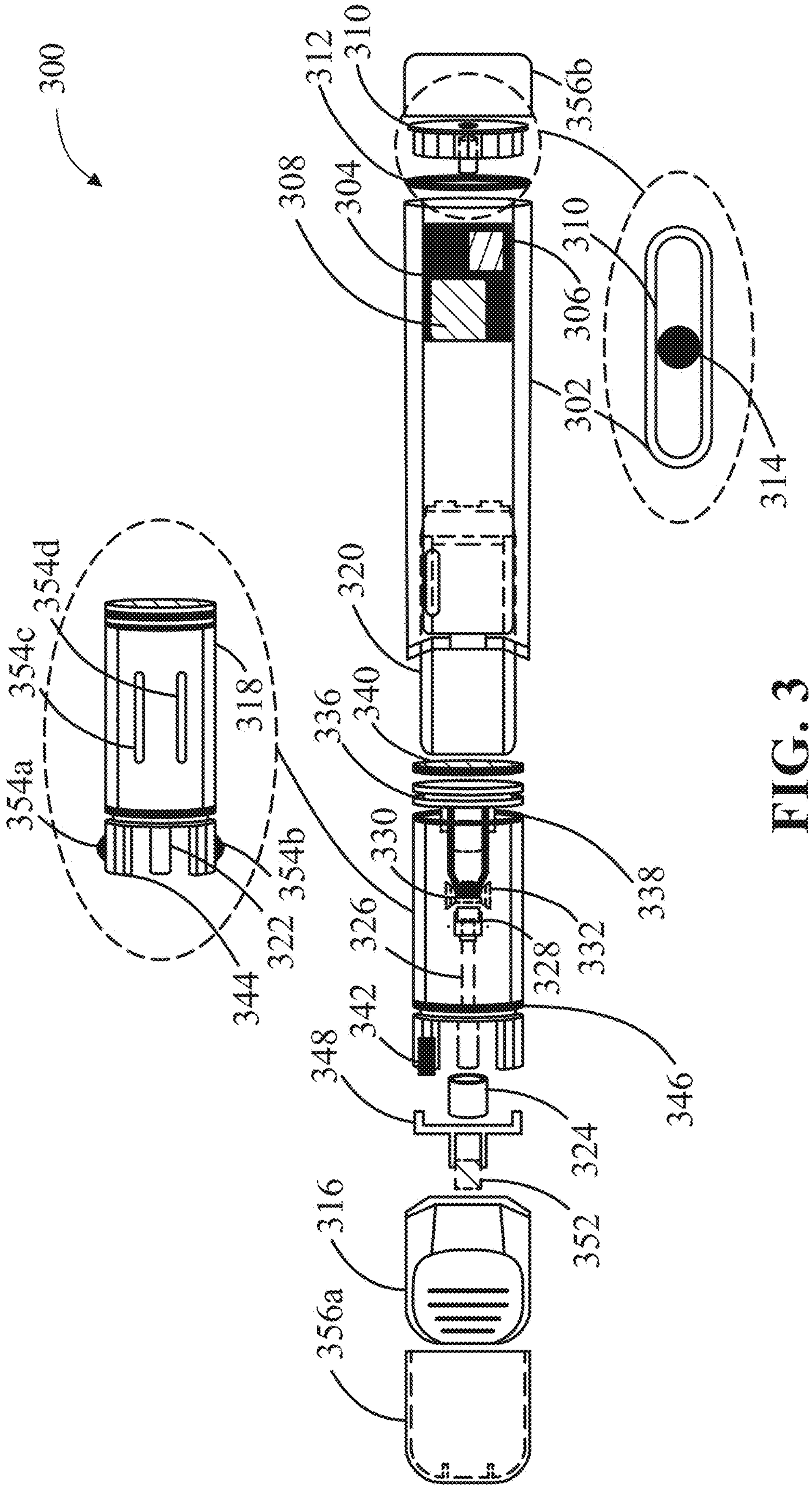
FIG. 3 is an illustration of an exemplary embodiment of an aerosol delivery device.

Now referring to FIG. 3, an exemplary embodiment of an aerosol delivery device 300 is illustrated (in an explosion view). Aerosol delivery device 300 described below may include an aerosol delivery device as disclosed in U.S. patent application Ser. No. 18/211,706, filed on Jun. 20, 2023, and entitled "APPARATUS AND METHOD FOR AEROSOL DELIVERY," which its entirety is incorporated herein by reference.

With continued reference to FIG. 3, aerosol delivery device 300 may include outer body 302. As used in this disclosure, an "outer body" is a container configured to encapsulate a plurality of internal elements of aerosol delivery device 300 such as, without limitation, any elements, components, and/or devices as described in detail below. In some embodiments, outer body 302 may be constructed from an injectable mold. In some cases, plastic material such as, without limitation, BIOGRADE B-M (i.e., blend of thermoplastic starch (TPS), aliphatic polyesters (AP) and natural plasticizers (glycerol and sorbitol)) may be injected into the injectable mold under high pressure, filling the space and taking on the shape of injectable mold. Other exemplary plastic materials may include, without limitation, BIOPAR FG MO (i.e., bio-plastic resin consisting mainly of thermoplastic potato starch, biodegradable synthetic copolyesters and additivies), BIOPLAST (i.e., new kind of plasticizer cherfreien thermoplastic material), ENSO RENEW RTP (i.e., renewable, biodegradable, compostable and economic thermoplastic), and/or the like.

With continued reference to FIG. 3, outer body 302 may include PCB 304 containing NFC chip 306 connected with one or more antennas 308. One end of outer body 302 may be enclosed by a body base 310. As used in this disclosure, a "body base" is a chassis of aerosol delivery device 300. In some cases, body base 310 may include a body base seal 312, wherein the body base seal 312 is a component that seals the connection between outer body 302 and body base 310, preventing leaks and ensuring proper functioning of aerosol delivery device 300. In a non-limiting example, body base seal 312 may create a tight seal when pressed against bottom of aerosol delivery device 300.

With continued reference to FIG. 3, in other cases, body base 310 may include a base plug 314 connected to PCB 304, wherein the base plug 314 may include, without limitation, a transmitter, a separate PCB, a pressure sensor, a light element, and/or the like; for instance, base plug 314 may include a separate PCB with integrated pressure sensor. For another instance, and without limitation, base plug 314 may also include a base light (e.g., a status indicator continuously indicates one or more status of aerosol delivery device 300). In a non-limiting example, status indicator may include a liquid fill level indicator, internal condition indicator, charging indicator, and/or the like. Additionally, or alternatively, base plug 314 may include a lighting scheme, wherein the lighting scheme may include one or more openings that allow light to shine through. In some cases, lighting scheme may include an opening in a shape of a logo or a shape of an initial of company producing aerosol delivery device 300. Further, a mouthpiece may fit into an opposite end of the end of aerosol delivery device 300 sealed by body base 310.

With continued reference to FIG. 3, aerosol delivery device 300 may include an aerosolizable material reservoir 318. As used in this disclosure, an "aerosolizable material reservoir" is a component of aerosol delivery device 300 configured to hold an aerosolizable material. "Aerosolizable material," for the purpose of this disclosure, is a material that is capable for aerosolization, wherein the aerosolization is a process of intentionally oxidatively converting and suspending particles or a composition in a moving stream of air. Aerosolizable material may include one or more active ingredients and/or chemicals, including without limitation pharmaceutical chemicals, recreational chemicals, flavor-bearing chemicals, and the like. Chemicals may be extracted, without limitation, from plant material, and/or a botanical, such as tobacco or other herbs or blends. Chemicals may be in pure form and/or in combination or mixture with humectants that may or may not be mixed with plant material. In a non-limiting example, aerosolizable material may include E-cigarette liquid, wherein the E-cigarette liquid is a liquid solution or mixture used in aerosol delivery device such as, without limitation, an e-cigarette.

With continued reference to FIG. 3, in some cases, aerosolizable material may include a humectant, wherein the "humectant" may generally refer to as a substance that is used to keep things moist. Humectant may attract and retain moisture in the air by absorption, allowing the water to be used by other substances. Humectants are also commonly used in many tobaccos or botanicals and electronic vaporization products to keep products moist and as vapor-forming medium. Examples may include, without limitation, propylene glycol, sugar polyols such as glycerol, glycerin, honey and the like thereof. Continuing the non-limiting example, E-cigarette liquid may consist a combination of propylene glycol and glycerin (95%), and flavorings, nicotine, and other additives (5%).

With continued reference to FIG. 3, in some embodiments, aerosolizable material held by aerosolizable material reservoir 318 may be replaceable. In a non-limiting example, aerosolizable material reservoir may include a secondary container such as a liquid chamber, wherein the liquid chamber may contain a single type of aerosolizable material. Liquid chamber may be inserted into aerosolizable material reservoir; in other words, aerosolizable material may not be in direct contact with aerosolizable material reservoir. User of aerosol delivery device 300 may switch from a first aerosolizable material to a second aerosolizable material by ejecting a first liquid chamber storing the first aerosolizable material from aerosolizable material reservoir 318 and inserting a second liquid chamber storing the second aerosolizable material into aerosolizable material reservoir 318.

With continued reference to FIG. 3, aerosol delivery device 300 may include a power source 320 e.g., at least one battery component as described above, containing one or more cell chemistries such as, without limitation, lithium cobalt oxide (LCO), lithium nickel cobalt aluminum oxide (NCA), lithium nickel manganese cobalt oxide (NMC), lithium iron phosphate (LFP), and the like; power source 320 may be rechargeable. In some embodiments, power source 320 may be further configured to transmit electric power to elements, components, and/or devices within aerosol delivery device 300 which requires electricity to operate, such as PCB 304 as described above.

With continued reference to FIG. 3, in an embodiment, reservoir 318 and power source 320 (e.g., battery) may be placed within outer body 302, in between mouthpiece 316 and body base 310. In some cases, reservoir 318 may include a channel 322, wherein the channel 322 is a pathway or a passage through which aerosolized material flows. 322 is also encased by a cotton absorption pad 324 (i.e., reservoir cotton), centered around 322. Channel 322 may either be molded into the reservoir as an extension of a vapor tube 326 or may be separate components. Vapor tube 326 may either be molded as part of 312 or be made of a different material and inserted later on. It's function is to transport aerosolized material from the heating chamber to the user. In a non-limiting example reservoir 318 may be in fluidic connection with heating element 330 such as, without limitation, a heating coil (i.e., a wire coil that heated to vaporize the aerosolizable material).

With continued reference to FIG. 3, a vapor channel seal 328 may be placed at the base of vapor tube 326 and encased the sides of heating element 330 to assist controlling of wicking and liquid flow into the heating chamber. Heating element 330 may include a resistive heater configured to thermally contact the aerosolizable material from aerosolizable material reservoir 318. Power source 320 may provide electricity to heating element. In a non-limiting example, using heating element for vaporization of aerosolizable material may be used as an alternative to burning (smoking) which may avoid inhalation of many irritating and/or toxic carcinogenic by-products which may result from pyrolytic processes of burning material such as, without limitation, tobacco or botanical products above 300 degrees C. Heating element may operate at a temperature at/or below 300 degrees C, configured by aerosol generation mechanism, controlled by control circuit. In a non-limiting example, heating element 330 may include an atomizer and/or a cartomizer.

With continued reference to FIG. 3, a "vapor channel seal," as described herein, is a sealing component in aerosol delivery device 300 that ensures an airtight seal and leak-proof seal within vapor path or airway. In an embodiment, a vapor channel seal 328 may be around the coil assembly (heating element 330). A heating coil cotton 332 may be wrapped around or threaded through the heating coil, ensuring that the aerosolizable material comes into contact with the heated coil when apparatus is activated. Heating coil cotton 332 may absorb aerosolizable material, and as the heating coil heats up, vaporizing the aerosolizable material, which may be then inhaled by the user. In a non-limiting example, heating coil cotton 332 may include a wick. In some cases, vapor channel seal 328 may also be configured to perform the function of wicking/funneling control similar to heating coil cotton 332. Additionally, or alternatively, heating element 330, vapor channel seal 328, and heating coil cotton 332 may be disposed inside reservoir 318 isolated from the aerosolizable material. Further, vapor channel seal 328 may serve as a seal with vapor tube; However, it also forms an aerosolization chamber when vapor channel seal 328 is inserted onto heating element 330 connected with the reservoir base 336 (i.e., liquid chamber deck).

With continued reference to FIG. 3, a reservoir base 336 may connect to reservoir 318. As used in this disclosure, a "reservoir base" refers to the base section of reservoir 318 which connected to heating element 330 (i.e., heating coil) and allows the wicking material such as, without limitation, heating coil cotton 332 to absorb aerosolizable material and deliver it to heating element 330 for vaporization. In a non-limiting example, reservoir base 336 with or without heating element 330, vapor channel seal 328, and/or heating coil cotton 332 attached may be inserted into reservoir 318 in a direction consistent with body base 310, along with a reservoir base seal 338, wherein the reservoir base seal 338 serves to prevent aerosolizable material from leaking out of reservoir 318 onto reservoir base 336 or other internal components such as, without limitation, power source 320, PCB 304, and/or the like. Additionally, or alternatively, a reservoir battery seal 340 may be disposed in between reservoir 318 and power source 320 (i.e., under reservoir base 328 and above power source 320), wherein the reservoir battery seal 340 serve as a secondary protection for power source 320, preventing aerosolizable material from leaking out through reservoir base 336 into power source 320.

With continued reference to FIG. 3, reservoir 318 may include a reservoir fill port seal 342. In an embodiment, reservoir 318 may include a reservoir fill port 344, wherein the reservoir fill port 344 is a small opening on reservoir 318 and/or outer body 302 of aerosol delivery device 300 that allows user to fill reservoir 318 with user-preferred aerosolizable material. In some cases, reservoir fill port may be located on the top of reservoir 318 and covered by reservoir fill port seal 342. As described herein, a "reservoir fill port seal" is a seal that prevents aerosolizable material from leaking out of the reservoir fill port and onto aerosol delivery device 300. In some cases, reservoir fill port seal 342 may include a removable cap or plug. Once reservoir 318 is filled, reservoir fill port seal 342 may be placed into reservoir fill port 344, sealing the reservoir fill port 344 and preventing e-liquid from leaking out.

With continued reference to FIG. 3, reservoir 318 may further include a reservoir seal 346 disposed at the opposite end of reservoir base seal 338. In a non-limiting example, reservoir seal 346 may be placed around reservoir fill port seal 342 and reservoir fill port 344. Snapping of mouthpiece 316 onto reservoir 318 may allow for both airflow management and avoiding condensation to seep out by configuring an airtight seal on top of reservoir 318. Airtight sealing both on top of reservoir 318 through reservoir seal 340 and bottom through reservoir base seal 338 may improve stability of active ingredient filled in reservoir 318 as it avoids contact with air (i.e., potential oxidation).

With continued reference to FIG. 3, cotton absorption pad 324 wrapped around the outlet of channel 322, may be referred to as a "reservoir cotton," as described herein, is a component configured to absorb any excess aerosolizable material may have been vaporized by heating element 330 but not inhaled by the user, preventing any aerosolizable material from entering the user's mouth through mouthpiece 316. Further, cotton stand 348 may also be mechanically connected to mouthpiece 316 and hold a further cotton such as, without limitation, a mouthpiece cotton 352. Mouthpiece cotton 352 may be fixed on top of cotton stand inside mouthpiece 316. In an embodiment, mouthpiece cotton 352 may be in contact with the outlet of mouthpiece 316 and may be used as a filter configured to help prevent aerosolizable material from entering the user's mouth. In some cases, mouthpiece cotton 352 may also help to reduce condensation and improve the overall vaping experience.

With continued reference to FIG. 3, reservoir 318 may include a plurality of alignment features 354*a-d* on the exterior. As used in this disclosure, an "alignment feature" on the exterior of reservoir 318 is a physical feature that helps to precisely and securely align and/or fix reservoir 318 within outer body 302. In a non-limiting example, reservoir 318 may be internally coupled to outer body 302 through plurality of alignment features 354*a-d*. In some cases, alignment feature may include one or more male alignment features 354*a-b*, wherein the male alignment features 354*a-b* may include physical features that projects outwardly from reservoir 318, while the female alignment features 354*c-d* may include corresponding physical feature that is recessed or indented into reservoir 318, designed to receive and align with male alignment features 354*a-b*. In a non-limiting example, reservoir 318 may be inserted into outer body 302 through press fit and/or snap fit. The interior of outer body may include a plurality of alignment features that match plurality of alignment features 354*a-d* on the reservoir 318. For instance, and without limitation, female alignment features 354*c-d* may include windows around reservoir 318, wherein these windows may be configured to fit plurality of male alignment features (e.g., bumps or protrusions) within outer body 302 at a desired location.

With continued reference to FIG. 3, aerosol delivery device 300 may include a top/bottom seal 356*a-b*, wherein the top/bottom seal 356*a-b*. Top seal 356*a* may be placed over (e.g., covering) the mouthpiece 316 while bottom seal 356*b* may be placed over end cap 310 and some portion of outer body 302 towards end cap 310. In some cases, during fluid e.g., air or vaporized aerosolizable material travel tight top/bottom seal 356*a-b*, such seal may help to stabilize the pressure changes and prevent any leakage that may occur. In an embodiment, one or more rubber extrusions/inserts (within top/bottom seal 356*a-b*) may help further create an airtight seal by inserting the extrusions/inserts into connecting components (e.g., mouthpiece 316, end cap 310, and/or the like).

With continued reference to FIG. 3, plurality of plastic components may include, without limitation, outer body 302, mouthpiece 316, reservoir 320, reservoir base 336, reservoir seal 346, cotton stand 348, top seal 356*a*, bottom seal 356*b*, and/or the like. Plastic components described herein may be made of eco-friendly, biodegradable, or otherwise compostable plastic such as, without limitation, plant-based plastic such as polylactic acid (PLA), polyhydroalkanoates (PHAs), polyhydroxy butyrate (PHB), Polyhdroxyvalerate (PHV), polyhydroxy hexanoate (PHH), and the like. In another non-limiting example, such plastic may also include petroleum-based plastics such as polyglycolic acid (PGA), polybutylene succinate (PBS). Polycaprolactone (PCL), polybutylene adipate terephthalate (PBAT), Oxo-degradable polypropylene (oxo-PP), and the like.

With continued reference to FIG. 3. in a non-limiting example, at least one battery component (i.e., power source 320) within outer body 302 may also be eco-friendly by implementing biodegradable electrolytes, as well as replacing non-biodegradable, petroleum-based polymers with those that can easily degrade, thereby minimizing the usage of non-renewable resources in power source 320. By removing metals, using biodegradable polymers, and implementing biodegradable electrolytes, batteries may become biodegradable themselves. However, even if power source 320 is a lithium-ion battery, a fully biodegradable plastic construction can allow the user to take out the battery of the device, recharge it, and reinsert it into a new body while composting or disposing of the old body. In this embodiment, the disposable unit would be biodegradable, and the battery would be recharged by the user and reinserted into a new disposable body. This construction, a form of a rechargeable disposable, may require a battery holder that is insertable into the body and protects the user from handling a battery directly. This construction may have a pair of pins or another method of forming an electrical connection with the heating element upon insertion, rather than being soldered together.

With continued reference to FIG. 3, in a non-limiting example, users 212 may elect to dispose the insertable battery separately in a second collection device designated for collecting battery component only, while being able to throw the biodegradable plastic unit away. In other embodiments, biodegradable plastics described herein may be used to fit a cartridge/rechargeable battery model. If mouthpiece were to be connected to the reservoir and aerosolization chamber, in the form of a cartridge, and that cartridge were to be insertable and detachable of the unit body containing a fixed and rechargeable battery, an electrical connection is required to form between the cartridge at insertion with the body. As user can keep the rechargeable body but would need to continue to buy the disposable cartridges, a cartridge made entirely out of biodegradable plastics would assist the user in not having to recycle the disposable part but yet create a sustainable use for small disposable cartridges.

Referring now to FIG. 4, an exemplary metric comparison 400 is shown. Metric comparison may include a formula for comparing initial device 128 and successor device 122. Formula may include:

$$\sum_{i=1}^{n}\left(\text{component}_{i,new} \times \text{CO2}_{i,new}\right) \le \sum_{j=1}^{m}\left(\text{component}_{j,old} \times \text{CO2}_{j,old}\right) \times \text{Comparison Coefficient}$$

With continued reference to FIG. 4, in some embodiments, equation may include an initial component count 404. Initial component count may include the number of times that an initial component is used in one initial device. In some embodiments, equation may include a successor component count 408. Successor component count 408 may include the number of times that an successor component is used in one successor device.

With continued reference to FIG. 4, in some embodiments, initial component count 404 may be multiplied by an initial carbon coefficient 412, which is further described with respect to FIG. 1. In some embodiments, successor component count 408 may be multiplied by a successor carbon coefficient 416, which is further described with respect to FIG. 1.

With continued reference to FIG. 4, in some embodiments, right-hand side of equation may be multiplied by a comparison coefficient 420. Comparison coefficient is further described with reference to FIG. 1.

With continued reference to FIG. 4, metric comparison 400 may be configured to quantify carbon emissions of each component of a new product, taking into account the CO2 emissions for the input of each unit. For instance, apparatus 100 may be configured to implement a mathematical formula, shown below, summing up the CO2 emissions of each component of the new product on the left side of the equation. In an exemplary embodiment, CO2 emissions can either be measured directly or product information can be taken from the literature, e.g. for a Lithium Ion battery that contains 3.5 g of lithium, metrics such as 1 T of lithium mining emits 15 T of CO2, can be used to estimate that 3.5 g of lithium will at least cost 52.5 g of CO2. In an example case of an aerosol delivery device made from a power source such as an LI battery, plastics, silicone, and chemical materials, the sum of all of these materials is the carbon cost of the whole units. Furthermore, secondary emission sources such as processes used in production (e.g. molding of a plastic component, energy use to create a Lithium Ion battery, etc.) can be added to this equation. Additionally, in the case of transportation CO2 emissions of materials, these can furthermore be added as well.

Referring back to FIG. 1, apparatus 100 may be configured to implement a methodology of quantifying ENDS environmental impact arising from (1) nicotine manufacturing and use, as well as (2) other chemical ingredients, battery, and plastic/metal components traditionally used in ENDS. Phase I quantifies the environmental impact of the manufacturing of ENDS by itself and against the context of traditional combustion tobacco manufacturing. In an embodiment, ENDS may include disposable ENDS (including rechargeable disposables), cartridge system ENDS, and open ENDS (tanks/e-liquids). Heat-not-burn systems will be sub-categorized under the cigarette category due to similarity in user behavior and product being made of tobacco leaf rolled in paper. The social impact analyses of ENDS, the non-ENDS related carbon emissions by manufacturers of ENDS, emissions of non-electronic RRPs such as snus or nicotine toothpicks, among other topics, are out of the scope of this study. These among others are candidates for future research.

With further reference to FIG. 1, apparatus 100 may be configured to examine a Manufacturing process of 1 gram of tobacco-derived nicotine (TDN) as compared to the manufacturing process of 1 gram of synthetic nicotine (SyN). Additionally, apparatus 100 may be configured to examine a manufacturing process of chemicals, lithium-ion batteries, plastics, and metals used as components in ENDS. Apparatus may use these to create a holistic environmental and social analysis of ENDS manufacturing—the first step of the ENDS product lifecycle—as compared to that of combustion and heat-not-burn products.

Figure 5:
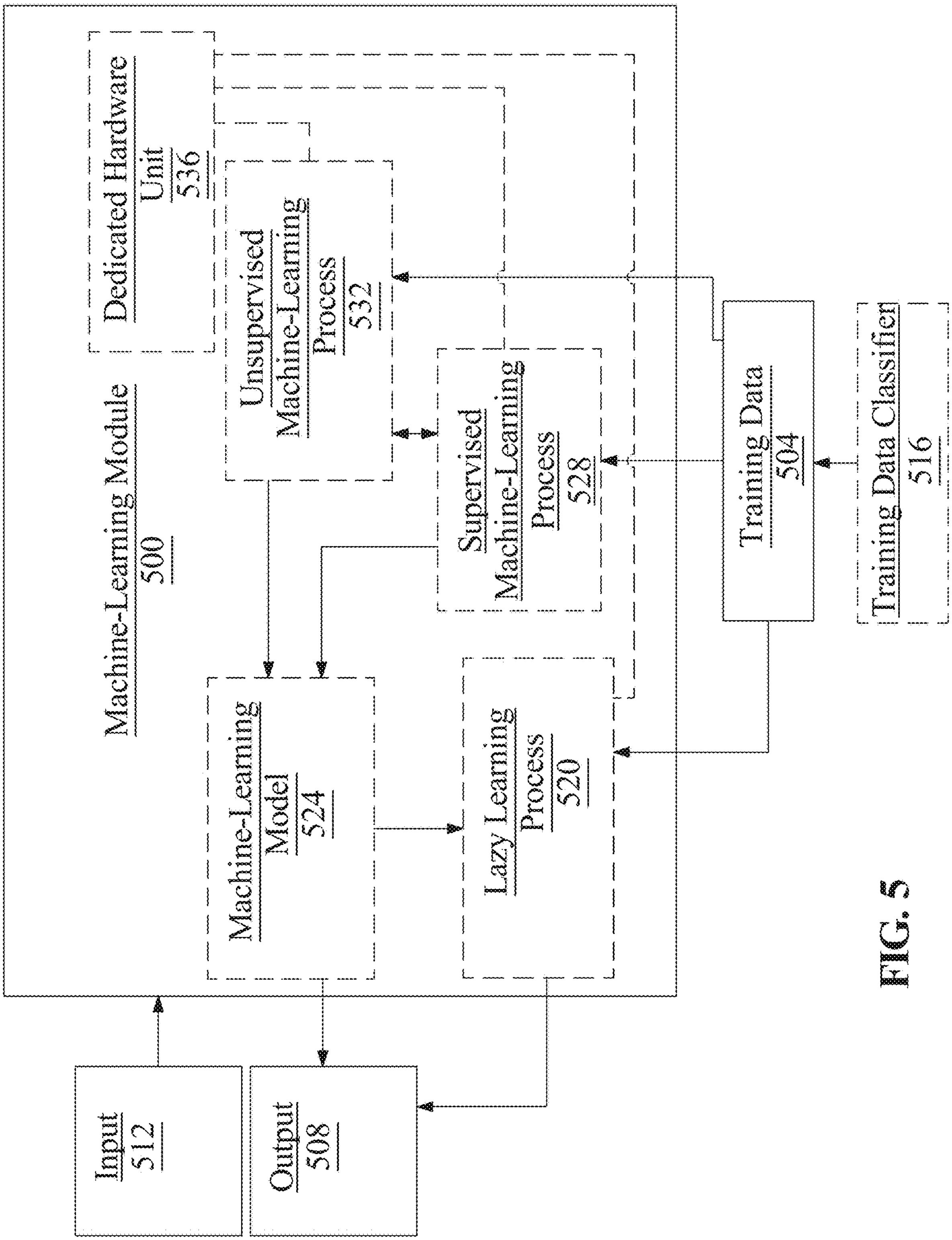
FIG. 5 is a block diagram of an exemplary machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example initial device data and successor device data correlated to comparison coefficients.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to similar localities, similar products, and the like.

Still referring to FIG. 5, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values $$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 5, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry.

Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
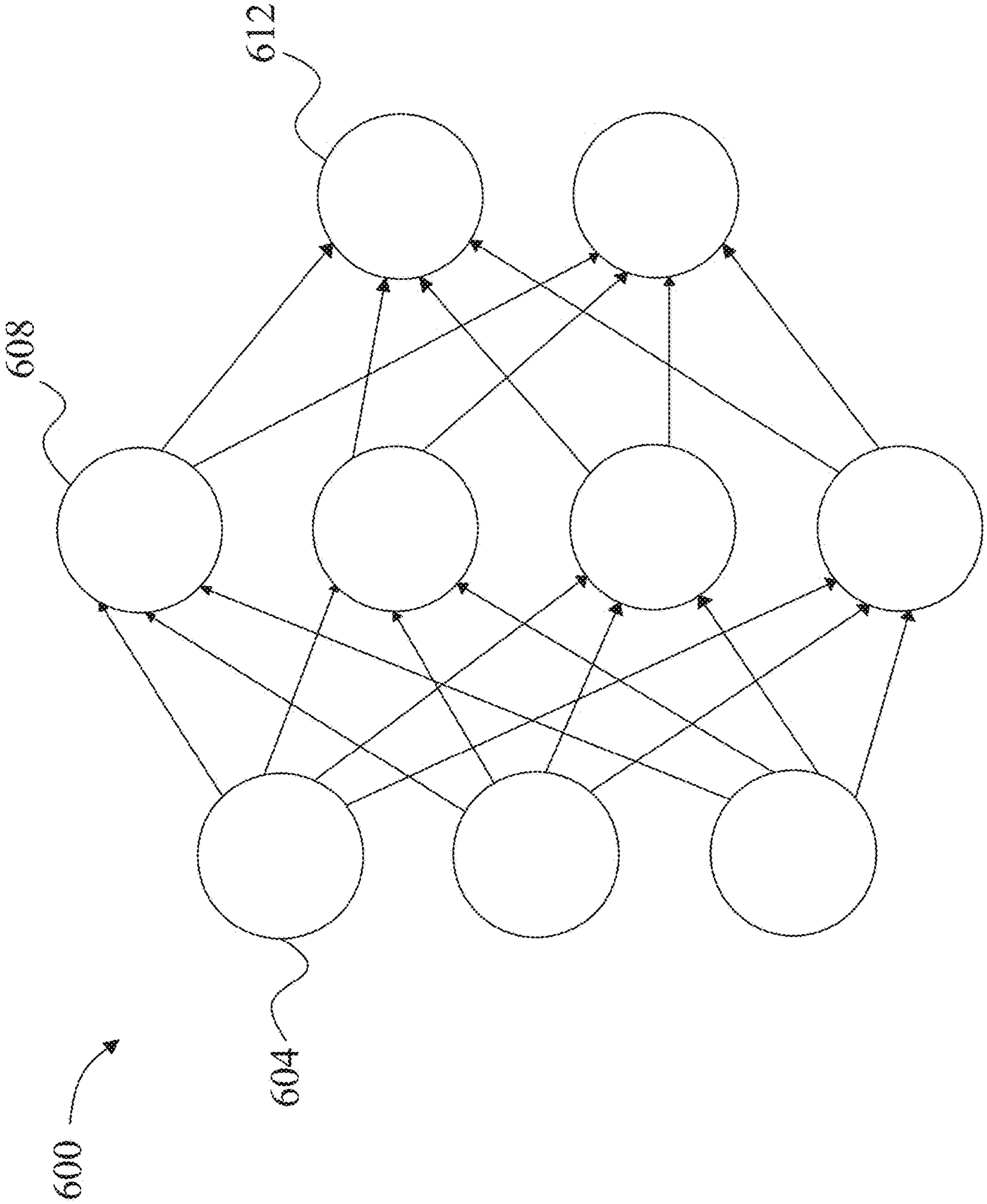
FIG. 6 is a diagram of an exemplary neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
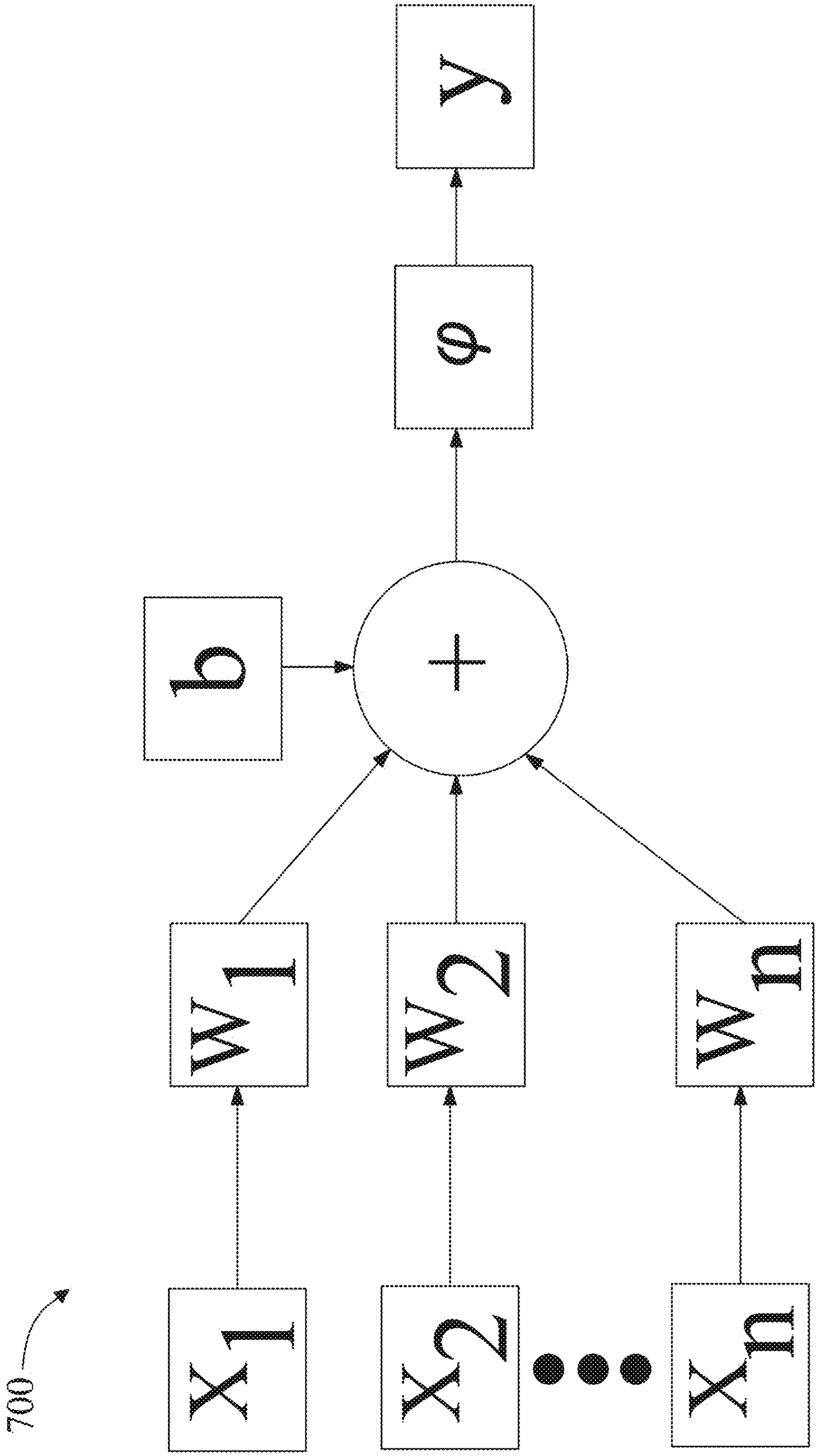
FIG. 7 is a diagram of an exemplary node in a neural network.

Referring now to FIG. 7, an exemplary embodiment of a node 700 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as $f(x)=\tan h^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tan h(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
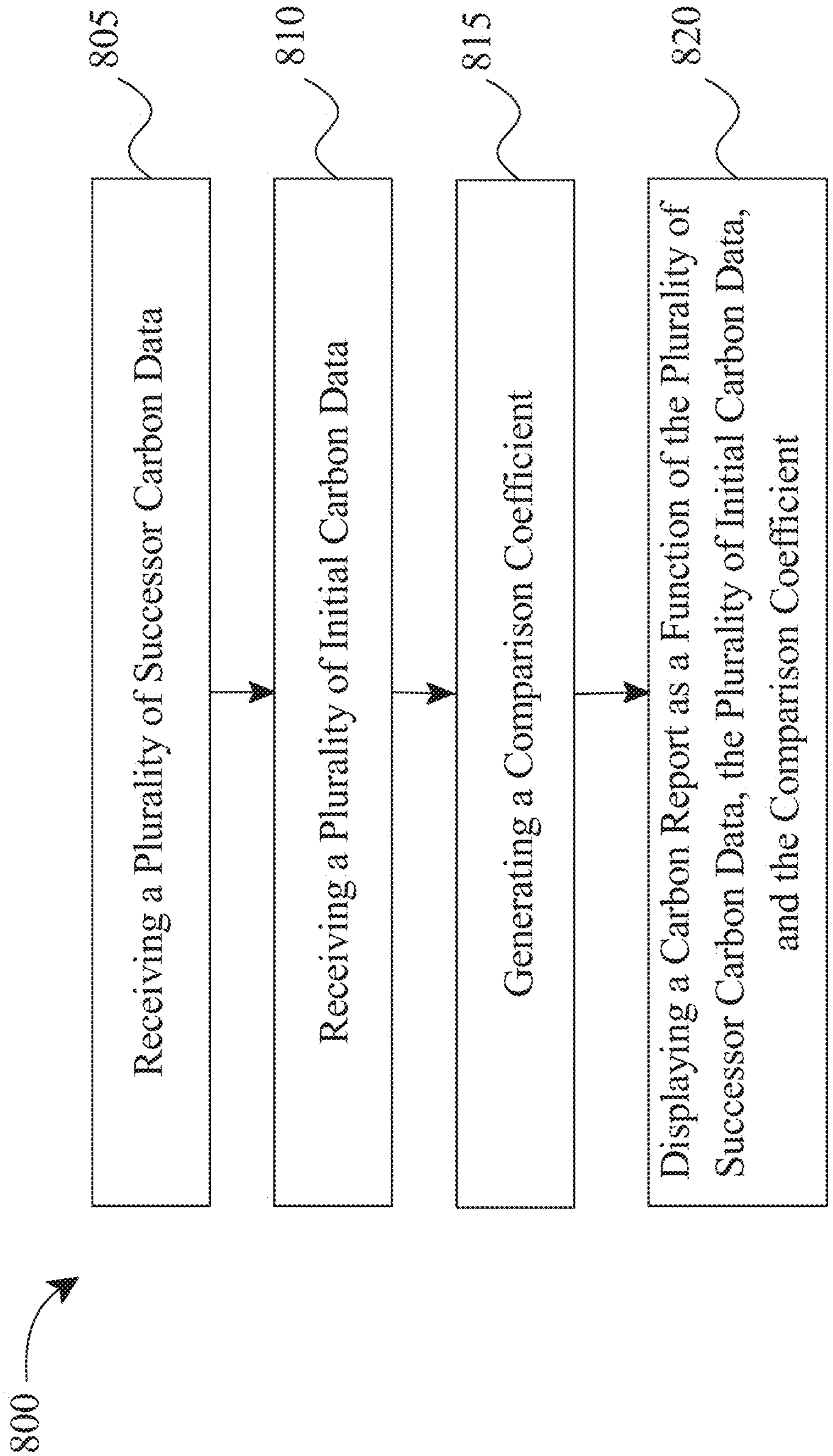
FIG. 8 is a flow diagram of an exemplary method for calculating comparisons coefficients for dissimilar datasets.

Referring now to FIG. 8, an exemplary method 800 for calculating comparison coefficients for dissimilar datasets is shown. Method 800 includes a step 805 of receiving, using at least a processor, a plurality of successor carbon data relating to one or more successor components of a successor device. This may be implemented as described with reference to FIGS. 1-7 above.

With continued reference to FIG. 8, method 800 includes a step 810 of receiving, using the at least a processor, a plurality of initial carbon data relating to one or more initial components of an initial device. This may be implemented as described with reference to FIGS. 1-7 above.

With continued reference to FIG. 8, method 800 includes a step 815 of generating, using the at least a processor, a comparison coefficient as a function of the successor device and the initial device, wherein the comparison coefficient compensates for a usage capacity of the initial device compared to the successor device. This may be implemented as described with reference to FIGS. 1-7 above.

With continued reference to FIG. 8, method 800 includes a step 820 of displaying, using the at least a processor and a graphical user interface, a carbon report as a function of the plurality of successor carbon data, the plurality of initial carbon data, and the comparison coefficient. This may be implemented as described with reference to FIGS. 1-7 above.

With continued reference to FIG. 8, method 800 may include additional step and sub-steps consistent with the disclosure with reference to FIGS. 1-7 above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
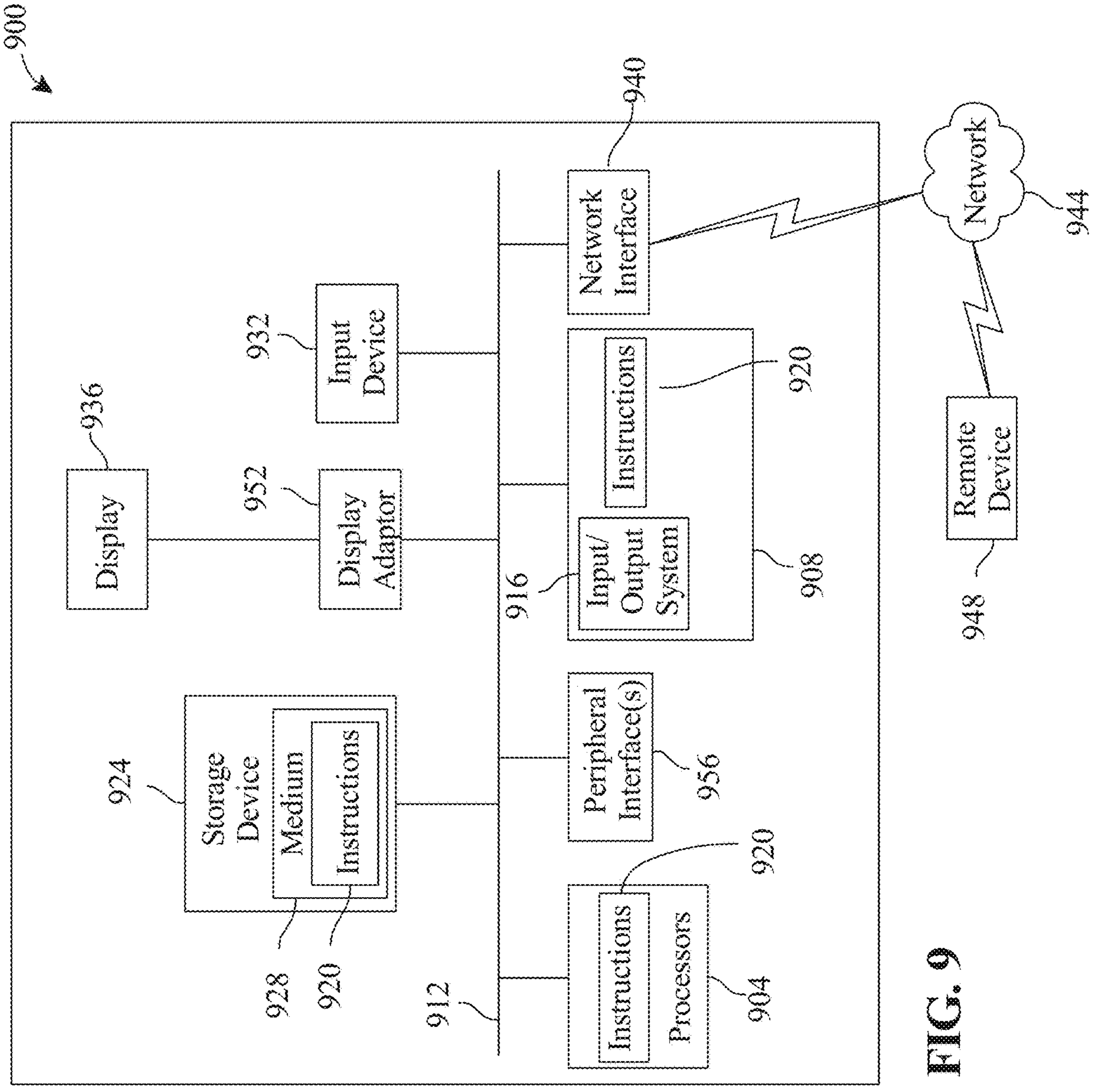
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for calculating comparison coefficients for dissimilar datasets, comprising:
- at least a processor; and
- a memory communicatively connected to the at least a processor, the memory containing instructions configuring the at least a processor to:
  - receive a plurality of successor carbon data relating to one or more successor components of a successor device, wherein the plurality of successor carbon data comprises a measurement of carbon dioxide emissions of the successor device obtained from one or more sensors;
  - receive a plurality of initial carbon data relating to one or more initial components of an initial device, wherein the plurality of initial carbon data comprises a measurement of carbon dioxide emissions of the initial device obtained from the one or more sensors;
  - generate, using a trained coefficient machine-learning model configured to receive the measurement of carbon dioxide emissions of the successor device and the measurement of carbon dioxide emissions of the initial device, a comparison coefficient as a function of the successor device and the initial device, wherein the comparison coefficient compensates for a usage capacity of the initial device compared to the successor device, wherein the trained coefficient machine-learning model is trained by:
    - receiving a plurality of data entries of coefficient training data;
    - identifying one or more relationships between the plurality of data entries; and
    - predicting a plurality of comparison coefficients corresponding to pairs of successor devices and initial devices as a function of the identified relationships; and
    - iteratively adjusting one or more parameters of the trained coefficient machine-learning model as a function of a prediction error; and
  - display, using a graphical user interface, a carbon report as a function of the plurality of successor carbon data, the plurality of initial carbon data, and the comparison coefficient, wherein the graphical user interface comprises a graphical user interface data structure, wherein the graphical user interface data structure comprises an event listener configured to detect receipt of a subsequent measurement of carbon dioxide emissions from the one or more sensors and an event handler configured to regenerate the carbon report as a function of the subsequent measurement of carbon dioxide emissions.

2. The apparatus of claim 1, wherein the memory contains instructions further configuring the at least a processor to process the plurality of successor carbon data, wherein processing the plurality of successor carbon data comprises determining a plurality of successor carbon coefficients, wherein each of the plurality of successor carbon coefficients correlates to a successor component of the one of more components of the successor device.

3. The apparatus of claim 2, wherein the memory contains instructions further configuring the at least a processor to process the plurality of initial carbon data, wherein processing the plurality of initial carbon data comprises determining a plurality of initial carbon coefficients, wherein each of the plurality of initial carbon coefficients correlates an initial component of the one of more components of the initial device.

4. The apparatus of claim 3, wherein the memory contains instructions further configuring the at least a processor to calculate a metric comparison, wherein calculating the metric comparison comprises:

forming a summed initial carbon coefficient comprising summing the plurality of initial carbon coefficients;

multiplying the summed initial carbon coefficient by the comparison coefficient to form an initial device metric; and forming a successor device metric comprising summing the plurality of successor carbon coefficients.

5. The apparatus of claim 4, wherein displaying the carbon report comprises displaying the metric comparison, wherein the metric comparison comprises a comparison between the initial device metric and the summed successor carbon coefficient.

6. The apparatus of claim 4, wherein forming the successor device metric further comprises:

calculating a reclamation metric by multiplying successor reclamation data by a reclamation threshold, wherein the reclamation threshold is a function of location data; and forming the successor device metric by subtracting the reclamation metric from the summed plurality of successor carbon coefficient.

7. The apparatus of claim 1, wherein:

receiving the plurality of successor carbon data relating to the one or more successor components of the successor device comprises receiving the plurality of successor carbon data using a web crawler; and receiving the plurality of initial carbon data relating to the one or more initial components of the initial device comprises receiving the plurality of initial carbon data using a web crawler.

8. The apparatus of claim 1, wherein:

the plurality of successor carbon data comprises successor reclamation data; and the plurality of initial carbon data comprises initial reclamation data.

9. The apparatus of claim 8, wherein the successor reclamation data comprises plastic reclamation data and electrolyte reclamation data.

10. The apparatus of claim 1, wherein generating the comparison coefficient as a function of the successor device and the initial device comprises:

generating comparison training data, wherein the comparison training data comprises successor device data and initial device data correlated to exemplary comparison coefficients;

training a comparison machine-learning model using the comparison training data; and generating, using the comparison machine-learning model, the comparison coefficient.

11. A method for calculating comparison coefficients for dissimilar datasets, comprising:

receiving, using at least a processor, a plurality of successor carbon data relating to one or more successor components of a successor device, wherein the plurality of successor carbon data comprises a measurement of carbon dioxide emissions of the successor device obtained from one or more sensors;

receiving, using the at least a processor, a plurality of initial carbon data relating to one or more initial components of an initial device;

generating, using the at least a processor and a trained coefficient machine-learning model configured to receive the measurement of carbon dioxide emissions of the successor device and the measurement of carbon dioxide emissions of the initial device, a comparison coefficient as a function of the successor device and the initial device, wherein the comparison coefficient compensates for a usage capacity of the initial device compared to the successor device, wherein the trained coefficient machine-learning model is trained by:

receiving a plurality of data entries of coefficient training data;

identifying one or more relationships between the plurality of data entries; and predicting a plurality of comparison coefficients corresponding to pairs of successor devices and initial devices as a function of the identified relationships; and iteratively adjusting one or more parameters of the trained coefficient machine-learning model as a function of a prediction error; and displaying, using the at least a processor and a graphical user interface, a carbon report as a function of the plurality of successor carbon data, the plurality of initial carbon data, and the comparison coefficient, wherein the graphical user interface comprises a graphical user interface data structure, wherein the graphical user interface data structure comprises an event listener configured to detect receipt of a subsequent measurement of carbon dioxide emissions from the one or more sensors and an event handler configured to regenerate the carbon report as a function of the subsequent measurement of carbon dioxide emissions.

12. The method of claim 11, further comprising processing, using the at least a processor, the plurality of successor carbon data, wherein processing the plurality of successor carbon data comprises determining a plurality of successor carbon coefficients, wherein each of the plurality of successor carbon coefficients correlates to a successor component of the one of more components of the successor device.

13. The method of claim 12, further comprising processing, using the at least a processor the plurality of initial carbon data, wherein processing the plurality of initial carbon data comprises determining a plurality of initial carbon coefficients, wherein each of the plurality of initial carbon coefficients correlates an initial component of the one of more components of the initial device.

14. The method of claim 13, further comprising calculating a metric comparison, using the at least a processor, wherein calculating the metric comparison comprises:

forming a summed initial carbon coefficient comprising summing the plurality of initial carbon coefficients;

multiplying the summed initial carbon coefficient by the comparison coefficient to form an initial device metric; and forming a successor device metric comprising summing the plurality of successor carbon coefficients.

15. The method of claim 14, wherein displaying the carbon report comprises displaying the metric comparison, wherein the metric comparison comprises a comparison between the initial device metric and the summed successor carbon coefficient.

16. The method of claim 14, wherein forming the successor device metric further comprises:

calculating a reclamation metric by multiplying successor reclamation data by a reclamation threshold, wherein the reclamation threshold is a function of location data; and forming the successor device metric by subtracting the reclamation metric from the summed plurality of successor carbon coefficient.

17. The method of claim 11, wherein:

receiving the plurality of successor carbon data relating to the one or more successor components of the successor device comprises receiving the plurality of successor carbon data using a web crawler; and receiving the plurality of initial carbon data relating to the one or more initial components of the initial device comprises receiving the plurality of initial carbon data using a web crawler.

18. The method of claim 11, wherein:

the plurality of successor carbon data comprises successor reclamation data; and the plurality of initial carbon data comprises initial reclamation data.

19. The method of claim 18, wherein the successor reclamation data comprises plastic reclamation data and electrolyte reclamation data.

20. The method of claim 11, wherein generating the comparison coefficient as a function of the successor device and the initial device comprises:

generating comparison training data, wherein the comparison training data comprises successor device data and initial device data correlated to exemplary comparison coefficients;

training a comparison machine-learning model using the comparison training data; and generating, using the comparison machine-learning model, the comparison coefficient.

* * * * *